United States Patent
Dillard et al.

(10) Patent No.: US 10,971,733 B2
(45) Date of Patent: Apr. 6, 2021

(54) RAPID SULFUR MELT DIFFUSION INTO CARBON HOST FOR MAKING ELECTRODES

(71) Applicants: Caitlin Nicole Dillard, Philadelphia, PA (US); Vibha Kalra, Garnet Valley, PA (US)

(72) Inventors: Caitlin Nicole Dillard, Philadelphia, PA (US); Vibha Kalra, Garnet Valley, PA (US)

(73) Assignee: Drexel University, Philadelphia, PA (US)

( * ) Notice: Subject to any disclaimer, the term of this patent is extended or adjusted under 35 U.S.C. 154(b) by 160 days.

(21) Appl. No.: 15/881,172

(22) Filed: Jan. 26, 2018

(65) Prior Publication Data
US 2018/0212252 A1    Jul. 26, 2018

Related U.S. Application Data

(60) Provisional application No. 62/450,852, filed on Jan. 26, 2017.

(51) Int. Cl.
*H01M 4/88* (2006.01)
*H01M 4/58* (2010.01)
(Continued)

(52) U.S. Cl.
CPC .......... *H01M 4/8875* (2013.01); *H01M 4/13* (2013.01); *H01M 4/136* (2013.01); *H01M 4/139* (2013.01); *H01M 4/1395* (2013.01); *H01M 4/1397* (2013.01); *H01M 4/366* (2013.01); *H01M 4/38* (2013.01); *H01M 4/587* (2013.01); *H01M 4/5815* (2013.01); *H01M 4/624* (2013.01); *H01M 4/80* (2013.01); *H01M 4/8882* (2013.01);
(Continued)

(58) Field of Classification Search
CPC .. H01M 4/5815; H01M 4/136; H01M 4/1397; H01M 4/366; H01M 4/587; H01M 4/1395
See application file for complete search history.

(56) References Cited

U.S. PATENT DOCUMENTS

| | | | |
|---|---|---|---|
| 2002/0045102 A1 | 4/2002 | Jung et al. | |
| 2011/0059361 A1* | 3/2011 | Wilkening | H01M 4/80 429/218.1 |

(Continued)

OTHER PUBLICATIONS

Laffont, L., et al. "An EELS Study of the Structural and Chemical Transformation of PAN Polymer to Solid Carbon." Carbon, vol. 42, No. 12, 2004, pp. 2485-2494.

(Continued)

*Primary Examiner* — Stephan J Essex
(74) *Attorney, Agent, or Firm* — Mendelsohn Dunleavy, P.C.

(57) ABSTRACT

A free-standing electrically conductive porous structure suitable to be used as a cathode of a battery, including an electrically conductive porous substrate with sulfur diffused into the electrically conductive porous substrate to create a substantially uniform layer of sulfur on a surface of the electrically conductive porous substrate. The free-standing electrically conductive porous structure has a high performance when used in a rechargeable battery. A method of manufacturing the electrically conductive porous structure is also provided.

22 Claims, 25 Drawing Sheets

(a) Pure CNF — CNF with sulfur sprinkled across top — Heat/pressure rapidly melt diffuse sulfur throughout the CNF electrode

(51) Int. Cl.

| | |
|---|---|
| H01M 4/136 | (2010.01) |
| H01M 4/1397 | (2010.01) |
| H01M 4/36 | (2006.01) |
| H01M 4/587 | (2010.01) |
| H01M 4/62 | (2006.01) |
| H01M 10/0525 | (2010.01) |
| H01M 4/1395 | (2010.01) |
| H01M 4/13 | (2010.01) |
| H01M 10/052 | (2010.01) |
| H01M 4/38 | (2006.01) |
| H01M 4/139 | (2010.01) |
| H01M 4/80 | (2006.01) |
| H01M 4/02 | (2006.01) |

(52) U.S. Cl.
CPC ..... *H01M 10/052* (2013.01); *H01M 10/0525* (2013.01); *H01M 4/625* (2013.01); *H01M 4/806* (2013.01); *H01M 2004/028* (2013.01)

(56) References Cited

U.S. PATENT DOCUMENTS

| | | | | |
|---|---|---|---|---|
| 2013/0309572 | A1* | 11/2013 | Zhang | H01M 4/5815 429/217 |
| 2014/0315100 | A1* | 10/2014 | Wang | H01M 4/366 429/319 |
| 2015/0372291 | A1* | 12/2015 | Ryu | H01M 4/366 429/231.4 |
| 2018/0183041 | A1* | 6/2018 | Tour | H01M 4/133 |

OTHER PUBLICATIONS

Li, Zihao, et al. "Sulfur Loaded in Micropore-Rich Carbon Aerogel as Cathode of Lithium-Sulfur Battery with Improved Cyclic Stability." Journal of Power Sources, vol. 334, 2016, pp. 23-30.
Li, Guoxing, et al. "Three-Dimensional Porous Carbon Composites Containing High Sulfur Nanoparticle Content for High-Performance Lithium-Sulfur Batteries." Nature Communications, vol. 7, 2016, p. 10601.
Wei Seh, Zhi, et al. "Sulphur-TiO2 Yolk-Shell Nanoarchitecture with Internal Void Space for Long-Cycle Lithium-Sulphur Batteries." Nature Communications, vol. 4, 2013, p. 1331.
Zhang, Chaofeng, et al. "Confining Sulfur in Double-Shelled Hollow Carbon Spheres for Lithium-Sulfur Batteries." Angewandte Chemie, vol. 124, No. 38, 2012, pp. 9730-9733.
Pang, Quan, et al. "Review—The Importance of Chemical Interactions between Sulfur Host Materials and Lithium Polysulfides for Advanced Lithium-Sulfur Batteries." Journal of the Electrochemical Society, vol. 162, No. 14, 2015, pp. A2567-A2576.
Song, Jiangxuan, et al. "Nitrogen-Doped Mesoporous Carbon Promoted Chemical Adsorption of Sulfur and Fabrication of High-Areal-Capacity Sulfur Cathode with Exceptional Cycling Stability for Lithium-Sulfur Batteries." Advanced Functional Materials, vol. 24, No. 9, 2014, pp. 1243-1250.
Ma, Lin, et al. "Enhanced Li—S Batteries Using Amine-Functionalized Carbon Nanotubes in the Cathode." Acs Nano, vol. 10, No. 1, 2016, pp. 1050-1059.
See, Kimberly A. A, et al. "Sulfur-Functionalized Mesoporous Carbons as Sulfur Hosts in Li—S Batteries: Increasing the Affinity of Polysulfide Intermediates to Enhance Performance." ACS Applied Materials and Interfaces, vol. 6, No. 14, 2014, pp. 10908-10916.
Zhou, Guangmin, et al. "Fibrous Hybrid of Graphene and Sulfur Nanocrystals for High-Performance Lithium-Sulfur Batteries." ACS Nano, vol. 7, No. 6, 2013, pp. 5367-5375.
Xi, Kai, et al. "Binder Free Three-Dimensional Sulphur/Few-Layer Graphene Foam Cathode with Enhanced High-Rate Capability for Rechargeable Lithium Sulphur Batteries." Nanoscale, vol. 6, No. 11, 2014, pp. 5746-5753.

Kazazi, et al. "Effect of Synthesis Method on the Morphological and Electrochemical Characteristics of Sulfur/MWCNT Composite Cathode." Solid State Ionics, vol. 290, 2016, pp. 40-46.
Wang, Chao, et al. "Macroporous Free-Standing Nano-Sulfur/Reduced Graphene Oxide Paper as Stable Cathode for Lithium-Sulfur Battery." Nano Energy, vol. 11, 2015, pp. 678-686.
Zeng, Linchao, et al. "Flexible Copper-Stabilized Sulfur-Carbon Nanofibers with Excellent Electrochemical Performance for Li—S Batteries." Nanoscale, vol. 7, No. 25, 2015, pp. 10940-10949.
Peng, Hong-Jie, et al. "Strongly Coupled Interfaces between a Heterogeneous Carbon Host and a Sulfur-Containing Guest for Highly Stable Lithium-Sulfur Batteries: Mechanistic Insight into Capacity Degradation." Advanced Materials Interfaces 1.7 (2014).
Li, Guochun, et al. "Sulfur/microporous carbon composites for Li—S battery." Ionics 21.8 (2015): 2161-2170.
Huang, Xiaodan, et al. "Mesoporous graphene paper immobilised sulfur as a flexible electrode for lithium-sulfur batteries." Journal of Materials Chemistry A 1.43 (2013): 13484-13489.
Zeng, Linchao, et al. "Free-standing porous carbon nanofibers-sulfur composite for flexible Li—S battery cathode." Nanoscale 6.16 (2014): 9579-9587.
Zhang, Biao, et al. "Recent advances in electrospun carbon nanofibers and their application in electrochemical energy storage." Progress in Materials Science 76 (2016): 319-380.
He, G., et al. "High "C" rate Li—S cathodes: sulfur imbibed bimodal porous carbons." Energy & Environmental Science 4.8 (2011): 2878-2883.
Fu, Kun, et al. "Sulfur gradient-distributed CNF composite: a self-inhibiting cathode for binder-free lithium-sulfur batteries." Chemical Communications 50.71 (2014): 10277-10280.
Zhang, Zhian, et al. "Titanium-dioxide-grafted carbon paper with immobilized sulfur as a flexible free-standing cathode for superior lithium-sulfur batteries." Journal of Power Sources 290 (2015): 159-167.
Zhou, Guangmin, et al. "A graphene-pure-sulfur sandwich structure for ultrafast, long-life lithium-sulfur batteries." Advanced materials 26.4 (2014): 625-631.
Zhao, Yan, et al. "Carbon/sulfur composite cathodes for flexible lithium/sulfur batteries: status and prospects." Frontiers in Energy Research 3 (2015): 2.
Wang, Jian-Gan, Keyu Xie, and Bingqing Wei. "Advanced engineering of nanostructured carbons for lithium-sulfur batteries." Nano Energy 15 (2015): 413-444.
Zhen, Li, et al. "Pie-like electrode design for high-energy density lithium-sulfur batteries." Nature communications 6 (2015): 8850.
Li, Zhen, et al. "A highly ordered meso@ microporous carbon-supported sulfur@ smaller sulfur core-shell structured cathode for Li—S batteries." ACS nano 8.9 (2014): 9295-9303.
Peng, Hong-Jie, et al. "Nanoarchitectured graphene/CNT@ porous carbon with extraordinary electrical conductivity and interconnected micro/mesopores for lithium-sulfur batteries." Advanced functional materials 24.19 (2014): 2772-2781.
Wang, Da-Wei, et al. "Carbon-sulfur composites for Li—S batteries: status and prospects." Journal of Materials Chemistry A 1.33 (2013): 9382-9394.
Liang, Xiao, et al. "A highly efficient polysulfide mediator for lithium-sulfur batteries." Nature communications 6 (2015): 5682.
Jayaprakash, N., et al. "Porous hollow carbon@ sulfur composites for high-power lithium-sulfur batteries." Angewandte Chemie 123. 26 (2011): 6026-6030.
Evers, Scott, and Linda F. Nazar. "New approaches for high energy density lithium-sulfur battery cathodes." Accounts of chemical research 46.5 (2012): 1135-1143.
Chen, Xi'an, et al. "Sulfur-Impregnated, Sandwich-Type, Hybrid Carbon Nanosheets with Hierarchical Porous Structure for High-Performance Lithium-Sulfur Batteries." Advanced energy materials 4.13 (2014).
Manthiram, Arumugam, et al. "Rechargeable lithium-sulfur batteries." Chemical reviews 114.23 (2014): 11751-11787.
Song, Min-Sang, et al. "Effects of nanosized adsorbing material on electrochemical properties of sulfur cathodes for Li/S secondary batteries." Journal of the Electrochemical Society 151.6 (2004): A791-A795.

(56) References Cited

OTHER PUBLICATIONS

Nazar, Linda F., Marine Cuisinier, and Quan Pang. "Lithium-sulfur batteries." MRS Bulletin 39.5 (2014): 436-442.

Li, Nian-Wu, Ya-Xia Yin, and Yu-Guo Guo. "Three-dimensional sandwich-type graphene@ microporous carbon architecture for lithium-sulfur batteries." Rsc Advances 6.1 (2016): 617-622.

Zhang, Lifeng, et al. "A review: carbon nanofibers from electrospun polyacrylonitrile and their applications." Journal of Materials Science 49.2 (2014): 463-480.

Wang, Da-Wei, et al. "Nitrogen-Doped Carbon Monolith for Alkaline Supercapacitors and Understanding Nitrogen-Induced Redox Transitions." Chemistry—A European Journal 18.17 (2012): 5345-5351.

Chen, Yan, et al. "Flexible Carbon Nanotube-Graphene/Sulfur Composite Film: Free-Standing Cathode for High-Performance Lithium/Sulfur Batteries." Journal of Physical Chemistry C, vol. 119, No. 19, 2015, pp. 10288-10294.

Cheon, S-E, et al. "Rechargeable Lithium Sulfur Battery. I. Structural Change of Sulfur Cathode during Discharge and Charge." Journal of the Electrochemical Society, vol. 150, No. 6, 2003, pp. A796-A799.

Hagen, M, et al. "Development and Costs Calculation of Lithium-Sulfur Cells with High Sulfur Load and Binder Free Electrodes." Journal of Power Sources, vol. 224, 2013, pp. 260-268.

Na Li, et al. "Flexible Graphene-Based Lithium Ion Batteries with Ultrafast Charge and Discharge Rates." Proceedings of the National Academy of Sciences, vol. 109, No. 43, 2012, p. 17360.

Ni, Wei, et al. "Multiscale Sulfur Particles Confined in Honeycomb-like Graphene with the Assistance of Bio-Based Adhesive for Ultrathin and Robust Free-Standing Electrode of LiS Batteries with Improved Performance." RSC Advances, vol. 6, No. 11, 2016, pp. 9320-9327.

Rahaman, et al. "A Review of Heat Treatment on Polyacrylonitrile Fiber." Polymer Degradation and Stability, vol. 92, No. 8, 2007, pp. 1421-1432.

Schneider, A., et al. "Free-Standing and Binder-Free Highly N-Doped Carbon/Sulfur Cathodes with Tailorable Loading for High-Areal-Capacity Lithiumsulfur Batteries." Journal of Materials Chemistry A, vol. 3, No. 41, 2015, pp. 20482-20486.

Wu, Chao, et al. "Free-Standing Graphene-Based Porous Carbon Films with Three-Dimensional Hierarchical Architecture for Advanced Flexible Lisulfur Batteries." Journal of Materials Chemistry A, vol. 3, No. 18, 2015, pp. 9438-9445.

Xu, GI, et al. "Porous Graphitic Carbon Loading Ultra High Sulfur as High-Performance Cathode of Rechargeable Lithium-Sulfur Batteries." Acs Applied Materials &Amp; Interfaces, vol. 5, No. 21, 2013, pp. 10782-10793.

Yuan, Zhe, et al. "Hierarchical Free-Standing Carbon-Nanotube Paper Electrodes with Ultrahigh Sulfur-Loading for Lithium-Sulfur Batteries." Advanced Functional Materials, vol. 24, No. 39, 2014, pp. 6105-6112.

Yu, Mingpeng, et al. "Dual-Protection of a Graphene-Sulfur Composite by a Compact Graphene Skin and an Atomic Layer Deposited Oxide Coating for a Lithium-Sulfur Battery." Nanoscale, vol. 7, No. 12, 2015, pp. 5292-5298.

Zhao, Yan, et al. "A Free-Standing Sulfur/Nitrogen-Doped Carbon Nanotube Electrode for High-Performance Lithium/Sulfur Batteries." Nanoscale Research Letters, vol. 10, No. 1, 2015, pp. 1-6.

Zhu, Lin, et al. "Interconnected carbon nanotube/graphene nanosphere scaffolds as free-standing paper electrode for high-rate and ultra-stable lithium-sulfur batteries." Nano Energy 11 (2015): 746-755.

Chung, Sheng-Heng, et al. "Electrochemically stable rechargeable lithium-sulfur batteries with a microporous carbon nanofiber filter for polysulfide." Advanced Energy Materials 5.18 (2015): 1500738.

Chung, Sheng-Heng, et al. "Porous carbon mat as an electrochemical testing platform for investigating the polysulfide retention of various cathode configurations in Li—S cells." The journal of physical chemistry letters 6.12 (2015): 2163-2169.

Dillard, Caitlin, et al. "Binder-free, freestanding cathodes fabricated with an ultra-rapid diffusion of sulfur into carbon nanofiber mat for lithium sulfur batteries." Materials today energy 9 (2018): 336-344.

Dillard, Caitlin, Arvinder Singh, and Vibha Kalra. "Polysulfide Speciation and Electrolyte Interactions in Lithium-Sulfur Batteries with in Situ Infrared Spectroelectrochemistry." The Journal of Physical Chemistry C 122.32 (2018): 18195-18203.

Lawrence, Daniel W., et al. "High-energy density nanofiber-based solid-state supercapacitors." Journal of Materials Chemistry A 4.1 (2016): 160-166.

Singhal, Richa, et al. "A free-standing carbon nanofiber interlayer for high-performance lithium-sulfur batteries." Journal of Materials Chemistry A 3.8 (2015): 4530-4538.

Tran, Chau, et al. "Binder-free three-dimensional high energy density electrodes for ionic-liquid supercapacitors." Chemical Communications 51.72 (2015): 13760-13763.

Tran, Chau, and Vibha Kalra. "Fabrication of porous carbon nanofibers with adjustable pore sizes as electrodes for supercapacitors." Journal of Power Sources 235 (2013): 289-296.

\* cited by examiner c) S-CNF cross-section

Sulfur

Carbon a) Side of sulfur-infusion (140 °C)

b) Opposite of sulfur-infusion (120 °C)

RAPID SULFUR MELT DIFFUSION INTO CARBON HOST FOR MAKING ELECTRODES

This invention was made with government support under Grant No. NSF-CBET-1236466 awarded by the U.S. National Science Foundation. The government has certain rights in the invention.

BACKGROUND OF THE INVENTION

1. Field of the Invention

The present invention relates to electrodes for lithium batteries. In particular, the invention relates to these electrodes and to a method of manufacturing these electrodes for lithium batteries by rapidly diffusing sulfur into a porous conductive substrate.

2. Description of the Related Technology

Since the commercialization of lithium-ion batteries in the early 1990's, demand of rechargeable batteries for portable electronics, electric vehicles, and large-scale electricity storage has exploded. Lithium sulfur (Li—S) batteries have attracted attention owing to its high theoretical capacity of 1675 mAh $g^{-1}$ and its high energy density (~2500 Wh $kg^{-1}$) which is about 5 times greater than that of lithium-ion batteries (about 500 Wh $kg^{-1}$). See L. F. Nazar, M. Cuisinier and Q. Pang, *MRS Bulletin*, 2014, 39, 436-442; S. E. Cheon, K. S. Ko, J. H. Cho, S. W. Kim, E. Y. Chin and H. T. Kim, *Journal of The Electrochemical Society*, 2003, 150, A796-A799; and US2002/0045102. In addition, sulfur is earth-abundant, inexpensive, and environmentally benign in comparison with other materials such as ion.

There are three key challenges for commercialization of Li—S batteries: (i) the electronically insulating nature of sulfur ($5 \times 10^{-30}$ S $cm^{-1}$ at 25° C.), (ii) large volume changes during lithiation-delithiation cycles (about 80%), and (iii) dissolution of soluble reaction intermediates ($Li_2S_n^{2-}$, 2<n≤8) into electrolytes which migrate to the anode upon cycling (the so-called shuttling effect). See D. W. Wang, Q. Zeng, G. Zhou, L. Yin, F. Li, H. M. Cheng, I. R. Gentle and G. Q. M. Lu, *Journal of Materials Chemistry A*, 2013, 1, 9382-9394; N. Jayaprakash, J. Shen, S. S. Moganty, A. Corona and L. A. Archer, *Angewandte Chemie*, 2011, 123, 6026-6030; S. Evers and L. F. Nazar, *Accounts of Chemical Research*, 2013, 46, 1135-1143; and M. S. Song, S. C. Han, H. S. Kim, J. H. Kim, K. T. Kim, Y. M. Kang, H. J. Ahn, S. X. Dou and J. Y. Lee, *Journal of The Electrochemical Society*, 2004, 151, A791-A795. All of these challenges contribute to poor performance of Li—S batteries by causing low sulfur utilization, fast capacity fade, poor cycling stability and low coulombic efficiency. Thus, there are significant research efforts to improve sulfur cathodes by adding conductive components to enhance sulfur utilization, using nanostructures to increase sulfur loading within the cathode, and confining sulfur in the cathodes to reduce polysulfide shuttling.

These efforts yielded various products based on highly sophisticated composites having different nano-architectures. For example, Liang et al produced composites by reacting manganese dioxide nanosheets with sulfides yielding high capacity and long cycle life (X. Liang, C. Hart, Q. Pang, A. Garsuch, T. Weiss and L. F. Nazar, *Nat Commun*, 2015, 6). Cui et al. produced sulfur-$TiO_2$ yolk-shell nanostructured cathodes with long cycle life. Many groups have developed micro/mesoporous carbon/sulfur composites that show excellent confinement of sulfur and soluble polysulfides. See K. Mi, Y. Jiang, J. Feng, Y. Qian and S. Xiong, *Advanced Functional Materials*, 2016, 26, 1571-1579; H. J. Peng, J. Q. Huang, M. Q. Zhao, Q. Zhang, X. B. Cheng, X. Y. Liu, W. Z. Qian and F. Wei, *Advanced Functional Materials*, 2014, 24, 2772-2781; X. a. Chen, Z. Xiao, X. Ning, Z. Liu, Z. Yang, C. Zou, S. Wang, X. Chen, Y. Chen and S. Huang, *Advanced Energy Materials*, 2014, 4, 1301988; Z. Li, J. T. Zhang, Y. M. Chen, J. Li and X. W. Lou, *Nat Commun*, 2015, 6; and J. G. Wang, K. Xie and B. Wei, *Nano Energy*, 2015, 15, 413-444. However, these sophisticated sulfur-nanomaterial composites require harsh sulfur slurry processing for their production. Such processes typically comprise rigorous mixing of sulfur/nanomaterials, inactive conductive carbon powders (about 10-30 wt. %), and insulating binding agents (about 10 wt. %) in a highly toxic solvent (NMP) to generate a thick slurry which is cast onto a heavy current collector (typically aluminum foil, about 5 mg $cm^{-2}$). See Y. Zhao, Y. Zhang, Z. Bakenova and Z. Bakenov, *Frontiers in Energy Research*, 2015, 3 and G. Zhou, S. Pei, L. Li, D. W. Wang, S. Wang, K. Huang, L. C. Yin, F. Li and H. M. Cheng, *Advanced Materials*, 2014, 26, 625-631. The additives and current collector account for 30-50% of the electrode weight. The final cathodes (with the current collector) contain only about 25 wt. % sulfur (a very low sulfur loading) despite having started with a sulfur nanocomposite with 80 wt. % sulfur. Furthermore, it is unclear to what extent the original architectures are retained after the rigorous mixing of the slurry containing the nanomaterials.

Other methods avoiding the slurry processing have been also been developed for making free-standing cathodes, such as by using vacuum filtration. See Y. Zhao, F. Yin, Y. Zhang, C. Zhang, A. Mentbayeva, N. Umirov, H. Xie and Z. Bakenov, *Nanoscale Research Letters*, 2015, 10, 450; A. Schneider, C. Suchomski, H. Sommer, J. Janek and T. Brezesinski, *Journal of Materials Chemistry A*, 2015, 3, 20482-20486; Y. Chen, S. Lu, X. Wu and J. Liu, *The Journal of Physical Chemistry C*, 2015, 119, 10288-10294; Z. Yuan, H. J. Peng, J. Q. Huang, X. Y. Liu, D. W. Wang, X. B. Cheng and Q. Zhang, *Advanced Functional Materials*, 2014, 24, 6105-6112; C. Wu, L. Fu, J. Maier and Y. Yu, *Journal of Materials Chemistry A*, 2015, 3, 9438-9445; L. Zhu, H. J. Peng, J. Liang, J. Q. Huang, C. M. Chen, X. Guo, W. Zhu, P. Li and Q. Zhang, *Nano Energy*, 2015, 11, 746-755; and W. Ni, J. Cheng, X. Li, Q. Guan, G. Qu, Z. Wang and B. Wang, *RSC Advances*, 2016, 6, 9320-9327. Unfortunately, vacuum filtration is impractical for large-scale production and requires extended drying (about 24-60 hours) to remove residual solvent.

Another significant drawback for producing these complex sulfur nanocomposites is that it involves a time-consuming sulfur deposition step. Regardless of the type of electrode, slurry-based or free-standing, nearly all porous nanostructures require laborious sulfur melt-diffusion, a technique where the materials are held at a temperature between the sulfur's melting (about 119° C.) and boiling (about 445° C.) temperatures for extended dwell times (10-12 hours) to allow liquid sulfur to diffuse into pores by capillary forces. See Z. Li, J. T. Zhang, Y. M. Chen, J. Li and X. W. Lou, *Nat Commun*, 2015, 6; J. G. Wang, K. Xie and B. Wei, *Nano Energy*, 2015, 15, 413-444; Y. Chen, S. Lu, X. Wu and J. Liu, *The Journal of Physical Chemistry C*, 2015, 119, 10288-10294; C. Wu, L. Fu, J. Maier and Y. Yu, *Journal of Materials Chemistry A*, 2015, 3, 9438-9445; X. Huang, B. Sun, K. Li, S. Chen and G. Wang, *Journal of Materials*

Chemistry A, 2013, 1, 13484-13489; Z. Zhang, Q. Li, K. Zhang, W. Chen, Y. Lai and J. Li, *Journal of Power Sources*, 2015, 290, 159-167; and L. Zeng, F. Pan, W. Li, Y. Jiang, X. Zhong and Y. Yu, *Nanoscale*, 2014, 6, 9579-9587. For example, Xu et al fabricated sulfur/porous graphitic carbon composites by melting and diffusing sulfur at 155° C. in 12 hours (G. L. Xu, Y. F. Xu, J. C. Fang, X. X. Peng, F. Fu, L. Huang, J. T. Li and S. G. Sun, *ACS Applied Materials & Interfaces*, 2013, 5, 10782-10793); He et al created bimodal mesoporous carbon/sulfur by melting and diffusing sulfur at 155° C. overnight (G. He, X. Ji and L. Nazar, *Energy & Environmental Science*, 2011, 4, 2878-2883); Lu et al produced sulfur/graphene oxide-ZnO by melting and diffusing sulfur at 160° C. in 10 hours (M. Yu, A. Wang, F. Tian, H. Song, Y. Wang, C. Li, J. D. Hong and G. Shi, *Nanoscale*, 2015, 7, 5292-5298); and Li et al made sulfur/mesoporous carbon composites using a two-step melt-diffusion, 155° C. for 8 hours followed by 300° C. for 3 hours (G. Li, H. Jing, H. Li, L. Liu, Y. Wang, C. Yuan, H. Jiang and L. Chen, *Ionics*, 2015, 21, 2161-2170).

When a shorter heating time for the sulfur was used in the above methods, the performance of the resulted electrodes is severely limited. For example, when 15 minutes heating time was used in some processes, the C-rates were generally low, not exceeding 0.06 C and 0.17 C, nor cycling stability beyond 50 cycles. Thus, a simple and practical sulfur melting-diffusion method that does not compromise electrochemical performance of the resulted electrodes is desired.

SUMMARY OF THE INVENTION

In one aspect, the present invention provides a free-standing electrically conductive porous structure suitable to be used as a cathode of a battery, comprising an electrically conductive porous substrate with a substantially uniform layer of sulfur on the surface of the electrically conductive porous substrate, where the free-standing electrically conductive porous structure contains less than 10 wt. % of graphene, based on a total weight of the electrically conductive porous structure, and a battery using the free-standing electrically conductive porous structure as a cathode has a C rate of at least 0.2 C at a discharge capacity of from about 400 mAh $g^{-1}$ to about 1675 mAh $g^{-1}$ with a cycling stability of at least 100 cycles In another aspect, the free-standing electrically conductive porous structure may be suitable to be used as a cathode without physical or chemical activation.

In another aspect, in any of the foregoing embodiment, the graphene, if present, is not functionalized or not functionalized with an amine.

In another aspect, the C rate of the battery using the free-standing electrically conductive porous structure of any of the foregoing embodiments may be at least 0.5 C, at least 0.75 C, or at least 1 C.

In another aspect, the cycling stability of the battery using the free-standing electrically conductive porous structure of any of the foregoing embodiments may be for at least 120 cycles, or at least 150 cycles or at least 170 cycles.

In yet another aspect, the free-standing electrically conductive porous structure of any one of the previous embodiments has a flexibility that passes the Mandrel Bend test (ASTM D522).

In yet another aspect, in the battery using the free-standing electrically conductive porous structure of any one of the previous embodiments the discharge capacity may be in the range of from about 700 mAh $g^{-1}$ to about 1625 mAh $g^{-1}$, or from about 800 mAh $g^{-1}$ to about 1600 mAh $g^{-1}$, or from about 900 mAh $g^{-1}$ to about 1500 mAh $g^{-1}$ at 0.5 C rate with a cycling stability of at least 100 cycles.

In yet another aspect, in the battery using the free-standing electrically conductive porous structure of any one of the previous embodiments the discharge capacity may be in a range of from about 400 mAh $g^{-1}$ to about 1675 mAh $g^{-1}$, or from about 900 mAh $g^{-1}$ to about 1600 mAh $g^{-1}$, or from about 1100 mAh $g^{-1}$ to about 1500 mAh $g^{-1}$ at 0.2 C rate with a cycling stability of at least 100 cycles.

In another aspect, the free-standing electrically conductive porous structure of any one of the previous embodiments may comprise a conductive additive in the sulfur selected from the group consisting of conductive carbon powders, graphite powders, mesoporous carbons, activated carbons, carbon nanotubes, MXenes, conductive polymers, conductive metal oxides/suboxides, metals and any other material that conducts electrons.

In another aspect, the electrically conductive porous substrate of any one of the previous embodiments may comprise a material selected from carbon nanofibers, carbon nanotubes, carbon rods, and combinations thereof.

In another aspect, the electrically conductive porous substrate of any one of the previous embodiments may have a porosity in a range of from about 10% to about 90%, or from about 70% to about 85%.

In another aspect, the electrically conductive porous substrate of any one of the previous embodiments may have pores with average pore diameter in a range of from about 0.1 nanometer to about 100 microns, or from about 1 nanometer to about 70 microns, or from about 100 nanometers to about 50 microns.

In another aspect, the electrically conductive porous substrate of any one of the previous embodiments has a conductivity in a range of from about $10^{-3}$ S/cm to about $10^5$ S/cm, or from about $10^{-1}$ to about $10^3$ S/cm, or from about 1 to about $10^2$ S/cm.

In another aspect, the free-standing electrically conductive porous structure of any one of the previous embodiments may have a sulfur content in a range of from about 10 wt. % to about 90 wt. %, or from about 30 wt. % to about 80 wt. %, or from about 30 wt. % to about 70 wt. %, or from about 40 wt. % to about 60 wt. %, or from about 45 wt. % to about 55 wt. %, based on a total weight of the structure.

In yet another aspect, the sulfur in the electrically conductive porous structure of any one of the previous embodiments may have an average particle size in a range of from 10 nm to 1000 nm, or from 20 nm to 1000 nm, or from 50 nm to 1000 nm, or from 100 nm to 1000 nm, or from 200 nm to 1000 nm.

In yet another aspect, the present invention provides a cathode comprising the electrically conductive porous structure of any one of the previous embodiments.

In yet another aspect, the cathode of the previous embodiments may have a sulfur loading in a range of from about 0.1 mg $cm^{-2}$ to about 15 mg $cm^{-2}$, or from about 0.5 mg $cm^{-2}$ to about 7 mg $cm^{-2}$, or from about 1 mg $cm^{-2}$ to about 5 mg $cm^{-2}$.

In yet another aspect, the present invention provides a battery having the cathode of any one of the previous embodiments.

In yet another aspect, the present invention provides a method of manufacturing an electrically conductive porous structure for a cathode of a battery, including a step of heating sulfur on an electrically conductive porous substrate to a temperature sufficient to melt the sulfur and allowing the melted sulfur to diffuse into the electrically conductive porous substrate.

In yet another aspect, the method of any one of the previous embodiments may use the sulfur in a powder form, or particle form.

In yet another aspect, the method of any one of the previous embodiments may be carried out at a temperature in a range of from about 119° C. to about 170° C., or from about 130° C. to about 160° C., or from about 140° C. to about 160° C., or from about 150° C. to about 160° C.

In yet another aspect, the method of any one of the previous embodiments may carry out the heating step for a period of from about 3 to about 500 minutes, or from about 5 to about 100 seconds, or from about 5 to about 50 seconds, or from about 3 to about 30 seconds.

In yet another aspect, the method of any one of the previous embodiments may be carried out at a pressure in a range of from about 15 psi to about 2000 psi, or from about 50 psi to about 2000 psi, or from about 100 psi to about 1000 psi, or from about 150 psi to about 800 psi, or from about 150 psi to about 500 psi.

In yet another aspect, the method of any one of the previous embodiments may use sulfur having an average particle size smaller than about 10 µm, or smaller than about 5 µm, or smaller than about 2 µm, or smaller than about 1 µm, or smaller than about 800 nm, or smaller than about 500 nm, or smaller than about 300 nm.

DETAILED DESCRIPTION OF THE PREFERRED EMBODIMENT(S)

Figure 1A:
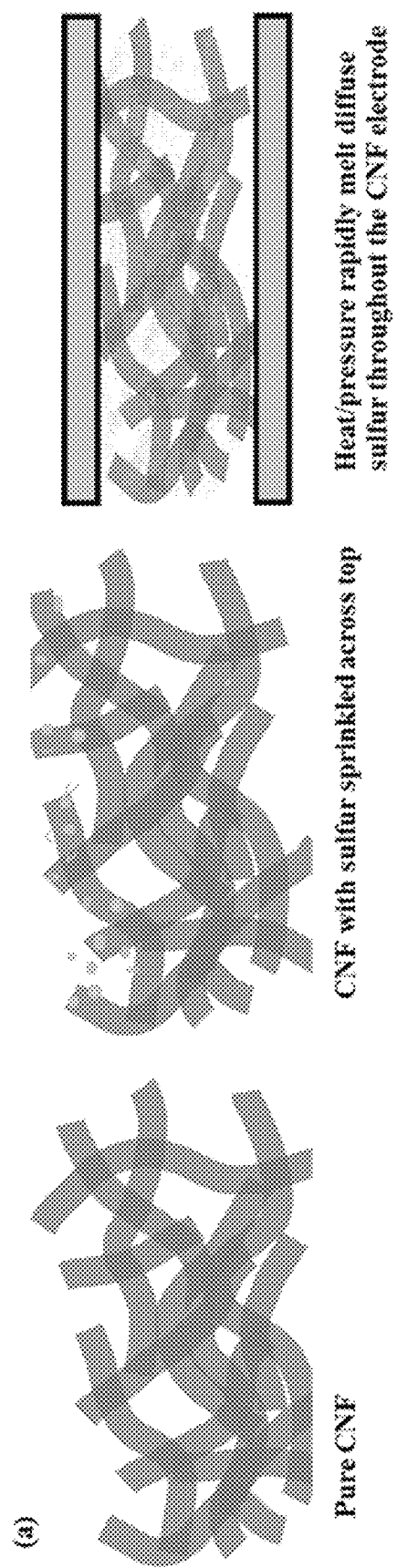
FIG. 1A is a schematic representation of the process for infusing sulfur into a carbon nanofiber (CNF) substrate.

For illustrative purposes, the principles of the present disclosure are described by referencing various exemplary embodiments. Although certain embodiments are specifically described herein, one of ordinary skill in the art will readily recognize that the same principles are equally applicable to, and can be employed in other systems and methods.

It is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel methods are therefore not limited to the particular arrangement of steps disclosed herein.

As used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

The C-rate is a measure of the rate at which a battery is discharged relative to its maximum capacity. A 1 C rate means that the discharge current will discharge the battery with 100% of its maximum capacity in 1 hour. For a battery with a capacity of 100 Amp-hrs, this equates to a discharge current of 100 Amps at a rate of 1 C. The C-rate can be expressed in one of two ways. Thus, a C-rate of C/5 is equivalent to a C-rate of 0.2 C, both of which refer to discharge of the battery with 100% of its maximum capacity in 5 hours. Similarly, a C-rate of C/2 and 0.5 C both refer to discharge of the battery with 100% of its maximum capacity in 2 hours. If a battery only delivers 50% of its maximum capacity, then at a 0.5 C (C/2) rate it will actually complete a discharge in only an hour, even though the current is set for C/2.

The present invention provides a free-standing electrically conductive porous structure suitable to be used as a cathode of a battery. The structure comprises an electrically conductive porous substrate with a layer of sulfur on the surface of the electrically conductive porous substrate, where the free-standing electrically conductive porous structure contains less than 10 wt. % of graphene, based on a total weight of the electrically conductive porous structure. The layer of sulfur and optional additives is located on the outer surface of the substrate and this sulfur diffuses into the pores of the substrate and forms a layer on the surface of the pores of the substrate as well. A battery using the free-standing electrically conductive porous structure as a cathode has a C rate of at least 0.2 C at a discharge capacity of from about 400 mAh $g^{-1}$ to about 1675 mAh $g^{-1}$ with a cycling stability of at least 100 cycles.

In some embodiments, the free-standing electrically conductive porous structure has a flexibility that passes the Mandrel Bend test (ASTM D522). The Mandrel Bend test is a standard test of the flexibility of a material, which is performed using the method of ASTM D522 or D522M-17. The test result may be a pass/fail for the flexibility of the tested material. The free-standing electrically conductive porous structure may be tested using the Mandrel Bend test with a passing result, which means that the structure has sufficient flexibility to meet the requirements of the Mandrel Bend test.

Unlike structures provided in the prior art, the free-standing electrically conductive porous structure of the present invention may be suitable to be used as a cathode without physical or chemical activation. Typical structures of the prior art require chemical or physical activation to be employed as a cathode, which activation may render those structures mechanically fragile and sufficiently inflexible so as not to be able to pass the Mandel Bend test, for example.

In some embodiments, the free-standing electrically conductive porous structure is an uncomplicated structure including only the substrate and sulfur, as well as possibly some minor amounts of impurities introduced with the sulfur. In certain embodiments of the free-standing electrically conductive porous structure contains less than 10 wt. %, or less than 5 wt. %, or less than 2 wt. % or less than 1 wt. % of graphene, based on a total weight of the electrically conductive porous structure. In one embodiment, the electrically conductive porous structure is completely free of graphene. The graphene in the electrically conductive porous structure, if present, may be graphene that is not functionalized, or graphene that is not functionalized with an amine.

The free-standing electrically conductive porous structure of the present invention can be used as cathode without having to add a current collector. Thus, the effective sulfur content of the cathode is higher than in many sulfur-based cathodes of the prior art which, require an additional current collector.

The free-standing electrically conductive porous structure of the present invention has a C rate of at least 0.2 C, or at least 0.5 C, or at least 0.75 C, or at least 1 C. Further, the free-standing electrically conductive porous structure of the present invention has a cycling stability of at least 100 cycles, or at least 120 cycles, or at least 150 cycles or at least 170 cycles.

In some embodiments, a battery using the free-standing electrically conductive porous structure as a cathode has a discharge capacity in a range of from about 400 mAh g-1 to about 1675 mAh $g^{-1}$, or from about 700 mAh $g^{-1}$ to about 1625 mAh $g^{-1}$, or from about 800 mAh $g^{-1}$ to about 1600 mAh $g^{-1}$, or from about 900 mAh $g^{-1}$ to about 1500 mAh $g^{-1}$ at a 0.5 C rate with a cycling stability of at least 100 cycles.

In some embodiments, the battery using the free-standing electrically conductive porous structure has a discharge capacity in a range of from about 400 mAh $g^{-1}$ to about 1675 mAh $g^{-1}$, or from about 900 mAh $g^{-1}$ to about 1600 mAh $g^{-1}$, or from about 1100 mAh $g^{-1}$ to about 1500 mAh $g^{-1}$ at a 0.2 C rate with a cycling stability of at least 100 cycles.

In some embodiments, the free-standing electrically conductive porous structure comprises a conductive additive which may be introduced by including the conductive additive in the sulfur that forms a layer on the surface of the substrate. This additive may be selected from the group consisting of conductive carbon powders, graphite powders, mesoporous carbons, activated carbons, carbon nanotubes, MXenes, conductive polymers, conductive metal oxides/suboxides, metals and any other material that conducts electrons.

In some embodiments, the free-standing electrically conductive porous structure comprises a viscosity reducing additive (such as selenium, tellurium, bromine or iodine) mixed with the sulfur to be introduced by melting and diffusing the sulfur into the substrate. The viscosity reducing additive can reduce the viscosity of the melted sulfur thus facilitating diffusion of the sulfur into the substrate.

In some embodiments, the free-standing electrically conductive porous structure comprises an additive mixed with the sulfur to be introduced by melting and diffusing the sulfur into the substrate that can favorably interact with sulfur and intermediate sulfur species (during device operation) such as polysulfides to prevent or reduce active material dissolution/loss into the electrolyte. The interaction can be, but not limited to, polar interaction, Lewis-acid base interaction, or via formation of thiosulfates. Examples of additives include compounds containing polar elements such as oxygen or nitrogen (metal oxides/suboxides such as zinc oxide, polymers such as polyaniline, for example), or compounds containing metals such as titanium or vanadium that can interact with sulfur via Lewis acid base interaction.

The foregoing additives may be used alone or in any combination with each other. The total amount of additive may comprise from 0.5 wt. % to 30 wt. %, or from 1 wt. % to 10 wt. %, based on the total weight of sulfur and additives. The skilled however understands that the amount of these additives may be adjusted depending on their conductivity, interaction strength, and particle size (surface area). Thus, routine testing provides guidance as to the amount of an additive to be used in the present invention.

The substrate used in the present invention may be carbon nanofibers, carbon nanotubes, carbon rods, and combinations thereof. These substrates may have a porosity in a range of from about 10% to about 90%, or from about 70% to about 85%, and have pores with average pore diameter in a range of from about 0.1 nanometer to about 100 microns, or from about 1 nanometer to about 70 microns, or from about 100 nanometers to about 50 microns. The substrates may have a conductivity in a range of from about $10^{-3}$ S/cm to about $10^5$ S/cm, or from about $10^{-1}$ to about $10^3$ S/cm, or from about 1 to about $10^2$ S/cm.

In some embodiments, the free-standing electrically conductive porous structure has a sulfur content in a range of from about 10 wt. % to about 90 wt. %, or from about 30 wt. % to about 80 wt. %, or from about 30 wt. % to about 70 wt. %, or from about 40 wt. % to about 60 wt. %, or from about 45 wt. % to about 55 wt. %, based on a total weight of the structure.

In some embodiments, the sulfur in the electrically conductive porous structure may have an average particle size in a range of from 10 nm to 1000 nm, or from 20 nm to 1000 nm, or from 50 nm to 1000 nm, or from 100 nm to 1000 nm, or from 200 nm to 1000 nm.

In some other embodiments, the electrically conductive porous structure has a sulfur loading of at least about 70 wt. %, or at least about 75 wt. %, or at least about 80 wt. %, or at least about 85 wt. %, of the total weight of the structure.

In some embodiments, the electrically conductive porous structure has a sulfur loading of at least about 6 mg cm$^{-2}$, or at least about 6.5 mg cm$^{-2}$, or at least about 7 mg cm$^{-2}$, or at least about 7.5 mg cm$^{-2}$, or at least about 8 mg cm$^{-2}$, or at least about 8.5 mg cm$^{-2}$, or at least about 9 mg cm$^{-2}$.

In another aspect, the present invention provides a cathode comprising the electrically conductive porous structure. In some embodiments, the cathode has surface functional groups such as amine, hydroxyl and carboxyl groups. The cathode does not contain a current collector. The cathode may have a sulfur loading in a range of from about 0.1 mg cm$^{-2}$ to about 15 mg cm$^{-2}$, or from about 0.5 mg cm$^{-2}$ to about 7 mg cm$^{-2}$, or from about 1 mg cm$^{-2}$ to about 5 mg cm$^{-2}$. In yet another aspect, the present invention provides a battery including the cathode.

In another aspect, the present invention provides a method for producing an electrically conductive porous structure for use in cathodes of batteries. The method includes a step of heating sulfur on an electrically conductive porous substrate to a temperature sufficient to melt the sulfur and allowing the sulfur to diffuse into the electrically conductive porous substrate.

In some embodiments, the electrically conductive porous substrate contains only electrically conducting materials that are stable in a battery electrolyte. Such materials include, but are not limited to, copper, tantalum, porous carbon and carbon fibers. In one aspect, the electrically conductive porous substrate comprises carbon nanofibers, carbon nanotubes, carbon rods, or combinations thereof.

The electrically conductive porous substrate may have a porosity sufficient to allow melted sulfur to diffuse into the substrate. The porosity of the electrically conductive substrate may be in a range of from about 50% to 90%, and is preferably in a range of about 70% to 85% with average pore sizes ranging from about 0.1 nanometers to about 100 microns in diameter, preferably from about 1 nanometer to about 70 microns in diameter, and most preferably from about 100 nanometers to about 50 microns in diameter. The electrically conductive porous substrate may have pore sizes in a range of 0.1 nanometer to 100 microns in diameter.

The conductivity of the electrically conductive porous substrate may vary over a range of from about $10^{-3}$ S/cm to about $10^5$ S/cm, preferably from about $10^{-1}$ S/cm to about $10^3$ S/cm, or most preferably from about 1 S/cm to about $10^2$ S/cm.

The sulfur content of the electrically conductive porous structure may be from about 10 wt. % to about 100 wt. %, depending on the specific application for which the electrode is designed. In some embodiments, the sulfur content of the electrically conductive porous structure is preferably in a range of from about 20 wt. % to about 90 wt. %, or preferably from about 30 wt. % to about 80 wt. %, or preferably from about 30 wt. % to about 70 wt. %, or preferably from about 40 wt. % to about 60 wt. %, or preferably from about 45 wt. % to about 55 wt. %, all based on a total weight of the electrically conductive porous structure.

In some embodiments, the sulfur used in the method for producing an electrically conductive porous structure may be in the form of small particles, preferably nano-sulfur to improve sulfur utilization and accessibility. The average particle size of the sulfur may be smaller than about 10 μm, or smaller than about 5 μm, or smaller than about 2 μm, or smaller than about 1 μm, or smaller than about 800 nm, or smaller than about 500 nm, or smaller than about 300 nm. Without wishing to be bound by theory, the use of smaller sulfur particles reduce time required to melt the sulfur thus accelerating the sulfur diffusion process.

The sulfur used in the method may be in a powder form, or particle form. The sulfur may contain some impurities. The sulfur may be precipitated sulfur, sulfur produced using any method or any other type of commercially available sulfur. Impurities in the sulfur normally do not have a significant impact on the electrode performance. The size of the sulfur particles on the electrically conductive substrate at the start of the heating step may influence the parameters of the heating step. For example, the required heating time and/or temperature may be shorter/lower when employing nano-sulfur, as compared to larger particles of other types of commercially available sulfur.

In the method, additional functional components may be blended with the sulfur prior to melting and/or diffusing the sulfur into the substrate. One such functional component is a conductive additive such as carbon black, carbon nanotubes, activated carbon, mesoporous carbon, graphite powder, MXenes, conductive polymers, metal oxides, and conductive suboxides. For example, conductive carbon powder can be blended into the sulfur to introduce more conductivity and improve interfaces between the sulfur and electron-transport surfaces.

In some embodiments, conductive additives may be added for the purpose of improving the utilization of the sulfur.

In some embodiments, a viscosity reducing additive may be added to the sulfur prior to melting and/or diffusing the sulfur into the substrate. The viscosity reducing addition can reduce the viscosity of the melted sulfur thus facilitating diffusion of the sulfur into the substrate.

In some embodiments, a polar additive may be added to the sulfur. The polar additive can interact with the sulfur in the free-standing electrically conductive porous structure.

The foregoing additives may be used alone or in combination. The total amount of additive(s) may be from 0.5% to 30%, or from 1% to 10%, based on the total weight of sulfur and additives.

The sulfur may be heated to any temperature within the melting temperature range of sulfur, namely, from about 119° C. to about 170° C. The ultimate temperature of the sulfur may, depend on the heating time. In some embodiments, heating may be a rapid process, and the temperature used to melt the sulfur is preferably in the range of from about 130° C. to about 160° C., or preferably from about 140° C. to about 160° C., or more preferably from about 150° C. to about 160° C. In other embodiments, the heating process may be a slower process and the temperature used to melt the sulfur may be lower, such as in the range of from about 120° C. to about 150° C., or preferably from about 125° C. to about 140° C., or more preferably from about 130° C. to about 140° C.

Heating and diffusion of the sulfur into the electrically conductive substrate may take from as little as 3 seconds, to as long as about 500 seconds. The time needed is partially dependent on the size and/or surface area of the sulfur particles, as well as the pore size and/or the thickness of the substrate. Larger pore sizes in the substrate allow more rapid diffusion of sulfur into the substrate, and, as a result, the heating time may be shorter. Thicker substrates may require a longer time for the sulfur to diffuse throughout the substrate, and thus the heating time may need to be longer. In some embodiments, the time for heating and diffusion of the sulfur into the electrically conductive substrate may be in a range of from about 5 seconds to about 100 seconds, or from about 5 seconds to about 50 seconds, or from about 5 seconds to about 30 seconds.

The heating time and temperature are inversely correlated. For example, when the temperature is higher, the heating time is reduced. When the temperature is lower, the heating time is increased. In one embodiment, the heating temperature is 120° C., and sulfur is melted and diffused into electrically conductive carbon nanofibers in about 60 seconds.

In some embodiments, the electrically conductive porous substrate may be exposed to a pressure in a range of from about 15 psi to about 2000 psi during heating and diffusion of the sulfur into the substrate. The desired pressure is dependent on the pore size, porosity, and thickness of the substrate. Preferably, the pressure is in a range of from about 15 psi to about 2000 psi or from about 50 psi to about 2000 psi, or from about 100 psi to about 1000 psi, or from about 150 psi to about 800 psi, or from about 150 psi to about 500 psi. Elevated pressure can be used to reduce diffusion time and ensure diffusion of the sulfur throughout the electrically conductive substrate.

In one embodiment, the electrically conductive porous substrate includes electrospun carbon nanofibers, preferably in the form of a nanofiber mat. The electrospun carbon nanofibers are impregnated with the melted sulfur to produce an electrode that may be used in rechargeable batteries such as lithium-sulfur and sodium-sulfur batteries. In this embodiment, powdered sulfur is located on the carbon nanofiber mat and heated under pressure for a time of about 3-6 seconds, or about 4-5 seconds to rapidly melt and diffuse the sulfur into the nanofiber mat. This produces a device-ready electrode that is free of binder and additional or separate current collectors.

In one aspect, free-standing electrospun carbon nanofibers are produced by electrospinning a solution of polyacrylonitrile. The electrospun fibers are subsequently heated to carbonize the fibers thereby forming a stable CNF mat. Sulfur is integrated into the CNF mat by rapidly heating and melting sulfur on the CNF mat under applied pressure. This quick melting-technique produces the final electrode, free of binding agents and completely device-ready. As such, no vacuum filtration or other processing is required.

The produced electrodes may be used to produce sulfur-containing cathodes for batteries. The resultant cathodes may have a sulfur loading in a range of from about 0.1 mg $cm^{-2}$ to about 15 mg $cm^{-2}$, or from about 0.5 mg $cm^{-2}$ to about 7 mg $cm^{-2}$, or from about 1 mg $cm^{-2}$ to about 5 mg $cm^{-2}$.

The cathodes may have an initial discharge capacity in a range of from about 700 mAh $g^{-1}$ to about 1675 mAh $g^{-1}$, or from about 900 mAh $g^{-1}$ to about 1600 mAh $g^{-1}$, or from about 1100 mAh $g^{-1}$ to about 1500 mAh $g^{-1}$ at a C/10 rate.

The cathodes typically have an initial discharge capacity in a range of from about 500 mAh $g^{-1}$ to about 1675 mAh $g^{-1}$, or from about 700 mAh $g^{-1}$ to about 1625 mAh $g^{-1}$, or from about 800 mAh $g^{-1}$ to about 1600 mAh $g^{-1}$, or from about 900 mAh $g^{-1}$ to about 1500 mAh $g^{-1}$ at a C/5 rate.

The cathodes were used as electrodes in CR2032 coin cells for electrochemical evaluation. Cathodes with a sulfur loading of 1.0 mg $cm^{-2}$ exhibited high discharge capacities of 1382, 1310, and 1140 mAh $g^{-1}$ at C/10, C/5, and C/2 rates, respectively (1 C=1675 mAh $g^{-1}$). These high discharge capacities indicate the CNF structure facilitates high sulfur utilization.

The current to each cell changes slightly because it must be calculated for the exact amount of sulfur loading in the individual electrode used in the cell. If 1 C=1675 mAh $g^{-1}$ for sulfur and the cathode contains 1 mg of sulfur, a 1 hr (or 1 C) charging rate means using a current of 1.675 mAmps. For a cell with a cathode containing 1.1 mg of sulfur, a 1 hr (or 1 C) charging rate would require 1.843 mAmps of current.

One cathode with a 0.6 mg $cm^{-2}$ (about 25 wt. %) sulfur loading tested at a C/10 rate exhibited a very high initial discharge capacity of 1625 mAh $g^{-1}$ (97% of the theoretical maximum, 1675 mAh $g^{-1}$) and a discharge capacity of 1000 mAh $g^{-1}$ at 100 cycles. The initial discharge capacity of this cell relative to the weight of the entire electrode (active sulfur+inactive materials) was 406 mAh $g^{-1}$. Cathodes with a higher sulfur loading (about 1 mg $cm^{-2}$ and 50 wt. %), tested at a faster C/5 rate also showed initial discharge capacities greater than 400 mAh $g^{-1}$. These initial discharge capacities are well above that of a typical Li-ion. For comparison, the maximum achievable discharge capacity of a $LiCoO_2$ cathode is about 140 mAh $g^{-1}$, which on a per gram-electrode basis, reduces to approximately 98 mAh $g^{-1}$ when the current collector/binder weight (about 30-50% of total electrode weight in this case) is factored into the performance per unit weight of the electrode.

The battery with the cathode may be conditioned by running the battery at a C-rate of from C/20 to C/10 for one cycle. Alternatively, the battery may be conditioned by running the battery for: (i) one cycle at C-rate of from C/10 to C/5; (ii) one cycle at a C-rate of from C/5 to C/2; and (iii) one cycle at a C-rate of from C/2 to C/1.

The present invention provides a novel sulfur melting technique to sulfurize free-standing, conductive nanostructures such as electrospun carbon nanofibers (CNFs). The nanostructure with the sulfur diffused therein can be used directly as facile cathodes for Li—S batteries without physical or chemical activation, or an additional or separate current collector. The nanostructure has a large internal spacing, facilitating rapid sulfur diffusion under rapid heating and slight pressure (140° C. and <250 psi) to obtain sulfur-based cathodes with a high sulfur loading. Unlike slurry-based cathodes, the continuous internal structure in the nanostructures provides the ability to retain uninterrupted electron transport networks by incorporating sulfur into a binder-free carbon host. Given the nanostructure-conductivity and the well-distributed sulfur, the sulfur-based cathodes of the present invention exhibited excellent cycling performance at reasonable C-rates. High discharge capacities of 1153 mAh g$^{-1}$ and 1022 mAh g$^{-1}$ were achieved for 0.1 C and 0.2 C rates, respectively. After conditioning, the sulfur-based cathodes of the present invention exhibited a discharge capacity of 550 mAh g$^{-1}$ 100% at a high 0.5 C rate, and capacity retention over 150 cycles with a Coulombic efficiency >99%. This exceptional capacity retention and stability may be attributable to polysulfide-attracting heteroatom functionalities present in the nanostructures due to incomplete carbonization.

Furthermore, sulfur-based cathodes of the present invention do not necessarily need to contain additional binders, additives, or a current collector, components that can make up as much as 50% of the electrode weight in the electrodes of the prior art. Therefore, in a more direct comparison with common slurry-based nanocomposites, the effective capacity of the sulfur-based cathode at 0.5 C can be translated to about 997 mAh g$^{-1}$ over 150 cycles. The simplicity of the sulfur melting procedure and the exceptional cycling stability of these free-standing sulfur-based composites provide a practical means for manufacturing Li—S cathodes.

The present invention is considerably more efficient than commonly used methods for diffusing sulfur into porous electrically conductive substrates to produce useful electrode structures. These methods typically take 2-48 hours, as well as other drawbacks. For example, the temperatures required for vapor deposition techniques (i.e. >300° C.) requires significantly more energy input, use of inert gases to prevent formation of toxic $SO_2$, and wastes a significant proportion of the sulfur raw material (about 60%) due to sublimation under the high temperature conditions over the long time periods needed (in many hours). The present invention can prepare high-capacity cathodes within just a few seconds at significantly lower temperatures (about 140° C.) with minimal waste of raw material. Further, the fast process and lower temperature eliminates hazards of prior art methods, thereby allowing the process to be performed in open air. Moreover, the prior art methods are not suitable for large-scale production, further hindering their use in production of new types of sulfur-containing cathodes. The present invention can be easily implemented in an industrial setting for large-scale production since it lends itself to use in combination with continuous production methods like roll-pressing.

The cathodes of the present invention may be used in lithium-sulfur or sodium-sulfur batteries. Such lithium-sulfur batteries have high discharge capacities in a range of from about 1200 mAh g$^{-1}$ to about 1675 mAh g$^{-1}$, or preferably from about 1400 mAh g$^{-1}$ to about 1625 mAh g$^{1}$, or more preferably from about 1500 mAh g$^{-1}$ to about 1600 mAh g$^{-1}$. These lithium-sulfur batteries also have an energy density in a range of from about 1800 Wh kg$^{-1}$ to about 2500 Wh kg$^{-1}$, or preferably from about 2000 Wh keto about 2400 Wh kg$^{-1}$, or more preferably from about 2200 Wh kg$^{-1}$ to about 2300 Wh kg$^{-1}$.

An exemplary embodiment of the disclosure is set forth in details below.

A. EXPERIMENTAL PROCEDURE

1. Carbon Nanofibers

For the preparation of carbon nanofibers, polyacrylonitrile (PAN, Sigma, MW=150,000) and N,N-dimethyl formamide (DMF, Sigma) were used without further treatment. Solutions were prepared by mixing 10 wt. % PAN in DMF and stirring for a minimum of 4 hours. These solutions were placed in a 5-mL syringe and a 20-gauge stainless steel needle. The flowrate used for electrospinning was 0.2-0.4 mL/hr with a constant applied voltage of about 9 kV. The distance between the nozzle tip and aluminum foil collector was about 15 cm. Free-standing PAN fiber mats were then made from the electrospun fibers and stabilized at 280° C. in air for 5 hr using a convection oven. Subsequent carbonization was carried out in a tube furnace at 1000° C. for 1 hr at a heating rate of 2° C./min under nitrogen flow.

2. Cathode Fabrication

Commercial sulfur (Sigma, 100 mesh) was used as purchased without additional treatment. CNF mats were punched into discs of about 11 mm in diameter. Sulfur powder was gently spread across the top of the CNF mat surface until sufficient mass was present to obtain a sulfur content of about 50-60 wt. % or about 1-2 mg cm$^{-2}$ in the S-CNF composite electrode. The sulfur and CNF mat were then placed between sheets of weighing paper and compressed in a heat press (Carver), pre-heated to 140° C., under a mild pressure of about 200 psi for precisely 5 seconds.

3. Electrochemical Characterization

In an argon-filled glovebox, coin cells (CR2032) were assembled from the S-CNF electrode, Celgard separator, 30-40 μL of electrolyte, a lithium foil anode, and nickel-foam spacers. The S-CNF electrodes were used directly as cathodes in these coin cells without any further treatment. The S-CNF electrodes were positioned such that the top side through which the sulfur was infused was facing away from the separator. The electrolyte composition was 1.85M lithium trifluoromethanesulfonate (Acros Organics) and 0.1M lithium nitrate (Sigma Aldrich) in a mixture of 1,2-dimethoxyethane (Sigma Aldrich) and 1,3-dioxolane (Acros Organics) in a 1:1 volume ratio. Prior to electrochemical testing, cells were allowed to rest at open circuit potential for 3 hours. Cyclability testing was completed with a MACCOR (4000 series) battery cycler at various C-rates (with 1 C=1,675 mA g$^{-1}$) in a potential range of 1.8 V and 2.6 V, with respect to Li/Li$^+$. Cyclic voltammetry (scan rate of 0.05 mV/s) and electrochemical impedance spectroscopy (frequency range of 0.01 Hz to 100 kHz) were completed on a potentiostat (Gamry reference 1000).

4. Materials Characterization

Nanofibers and S-CNF cathodes were characterized with a scanning electron microscope (SEM, Zeiss Supra 50VP) equipped with EDS (Oxford) for carbon and sulfur mapping. The materials were characterized with X-ray photoelectron spectroscopy (XPS, Physical Electronics VersaProbe 5000 spectrometer) with a monochromated Al Ka excitation source and X-ray diffraction (Rigaku SmartLab).

B. RESULTS AND DISCUSSION

Free-standing sulfur-carbon nanofiber (S-CNF) cathodes were fabricated by diffusing melted sulfur into a carbon nanofiber mat produced by electrospinning. The advantages of using electrospun nanofibers for rechargeable battery electrodes are two-fold: (i) they are inherently free-standing at each step of fabrication obviating the need for binders, additional or separate current collectors, or costly slurry-based fabrication steps and (ii) CNFs provide an excellent nano-architecture for cathodes in the form of continuous conductive pathways for uninterrupted electron-transport. Furthermore, the inter-fiber macropores facilitate electrolyte diffusion to the sulfur for redox reactions to occur.

Figure 1B:
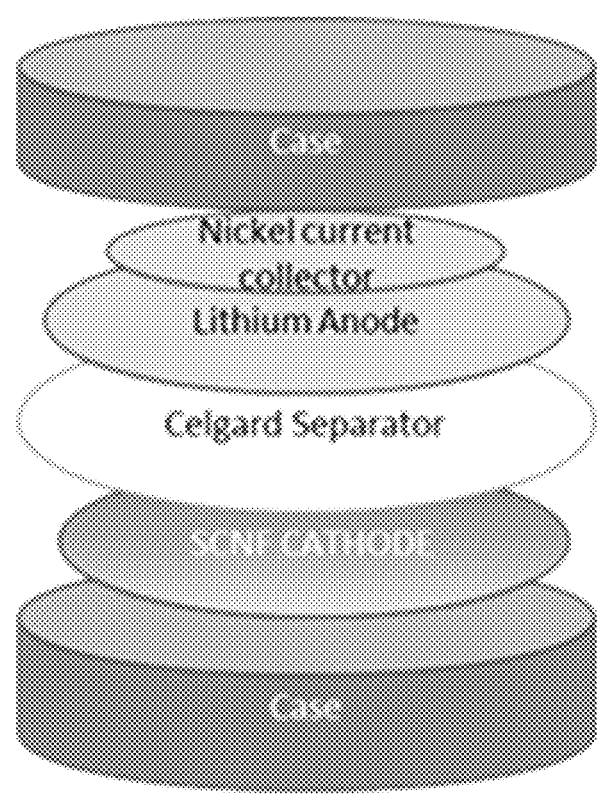
FIG. 1B shows a coin cell battery assembly with the electrode (cathode) of the present invention.
Figure 2:
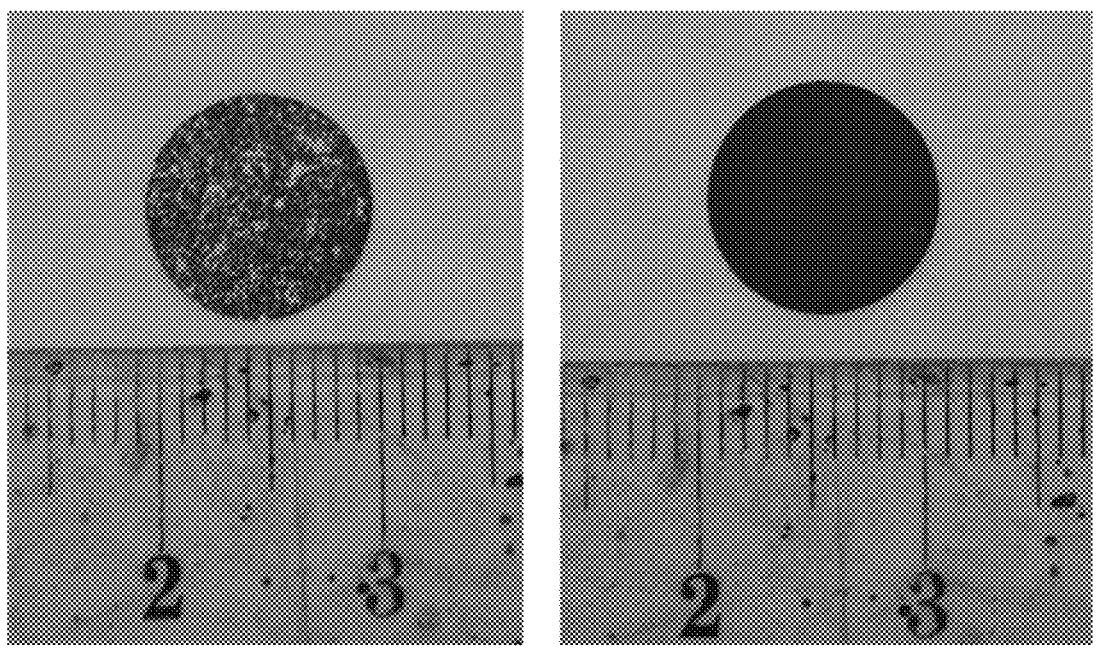
FIG. 2 shows the cathode of the present invention before and after a 5-second heat-treatment, respectively.

Schematics of the S-CNF cathode fabrication and battery cell configuration are shown in FIGS. 1A-1B. The sulfur powder was dispersed directly along one side of the CNF disc. After sulfurizing, the elemental sulfur was no longer visible to the naked eye (see FIG. 2). The sulfur was rapidly melted and diffused into the CNF mat in just 5 seconds by applying a slight pressure of about 200 psi and heat in a hydraulic heat-press. The press plates were preheated to 140° C. to rapidly melt the sulfur (melting temperature of sulfur is about 119° C.), but operated well below the temperature at which sulfur ring-opening polymerization begins (159° C.). Unlike conventional sulfur sublimation or melt-diffusion, this simplified method is compatible with roll-to-roll industrial processes as well as safe under normal operating conditions in air without the risk of hazardous formation of hazardous reaction products, such as $SO_2$.

Figure 3A:
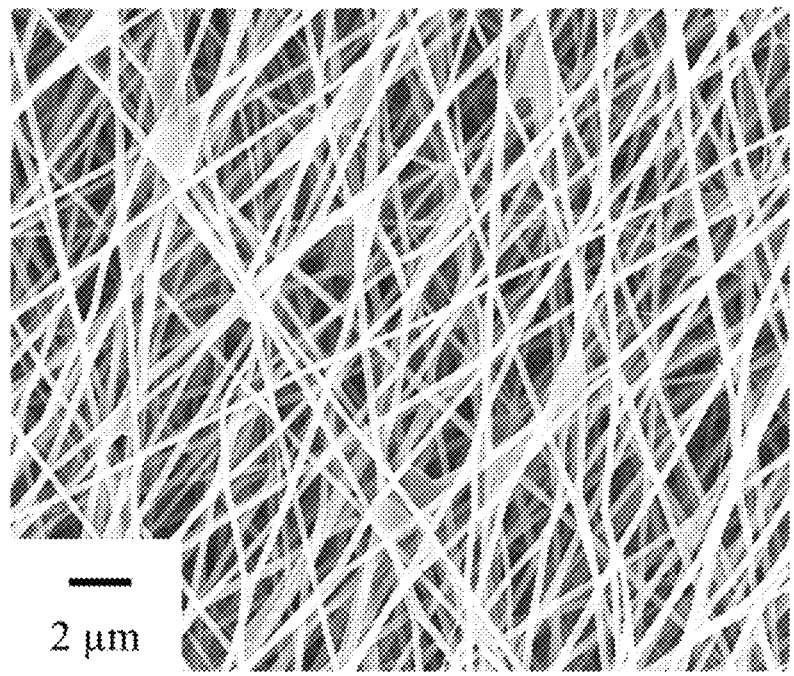
FIGS. 3A-3B show scanning electron microscope (SEM) images of sulfur-infused CNF substrate on the side from which sulfur was infused and from the side opposite of sulfur infusion, respectively.
Figure 3B:
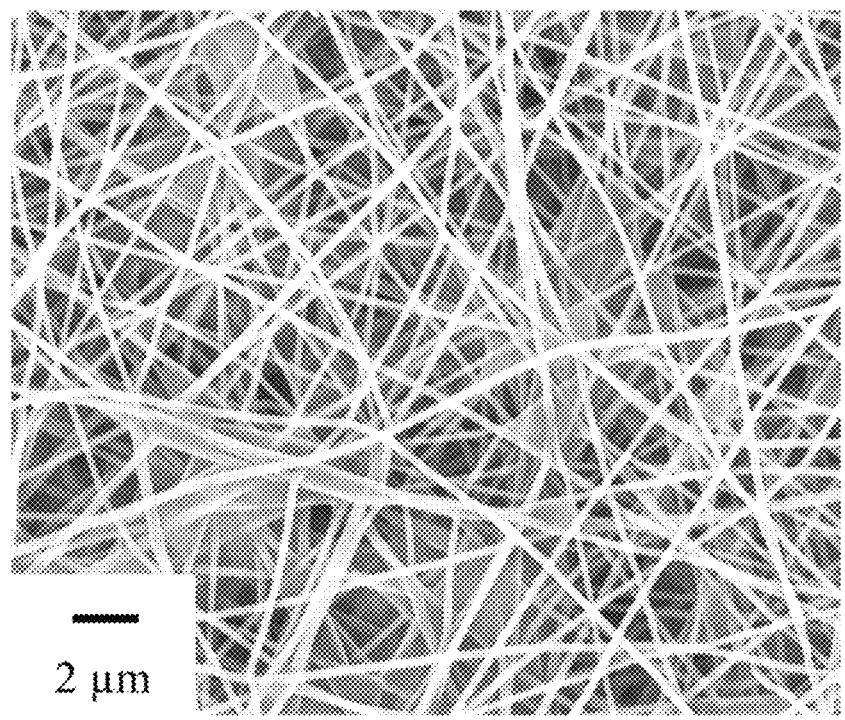
Figure 3C:
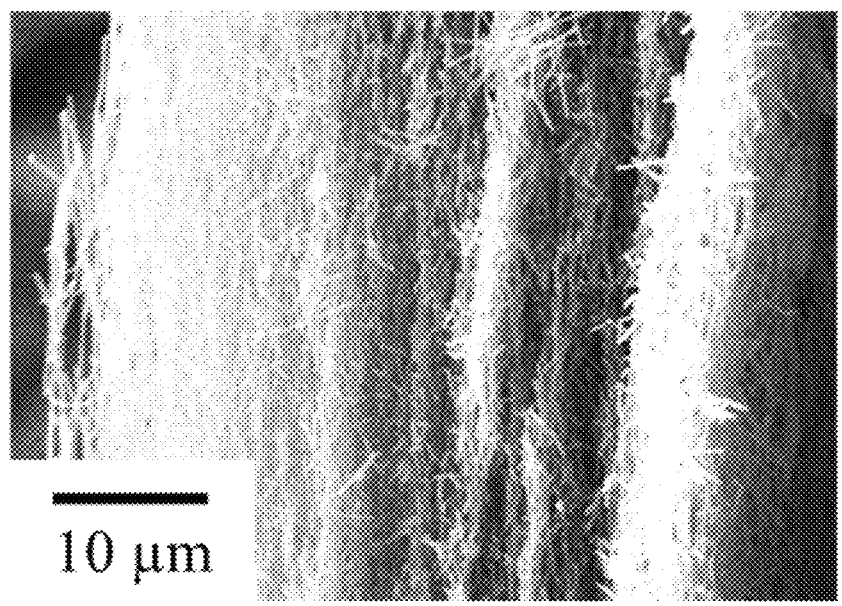
FIG. 3C shows a cross-section of the cathode of the present invention.
Figure 3D:
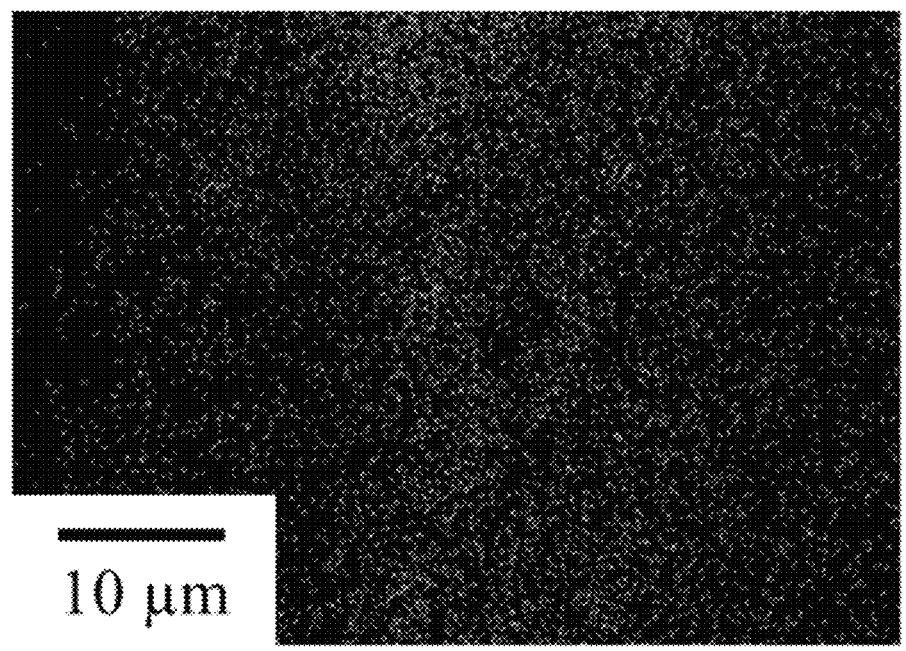
FIG. 3D shows the cross-section of FIG. 3C with an energy-dispersive X-ray spectroscopy (EDS) sulfur map.
Figure 3E:
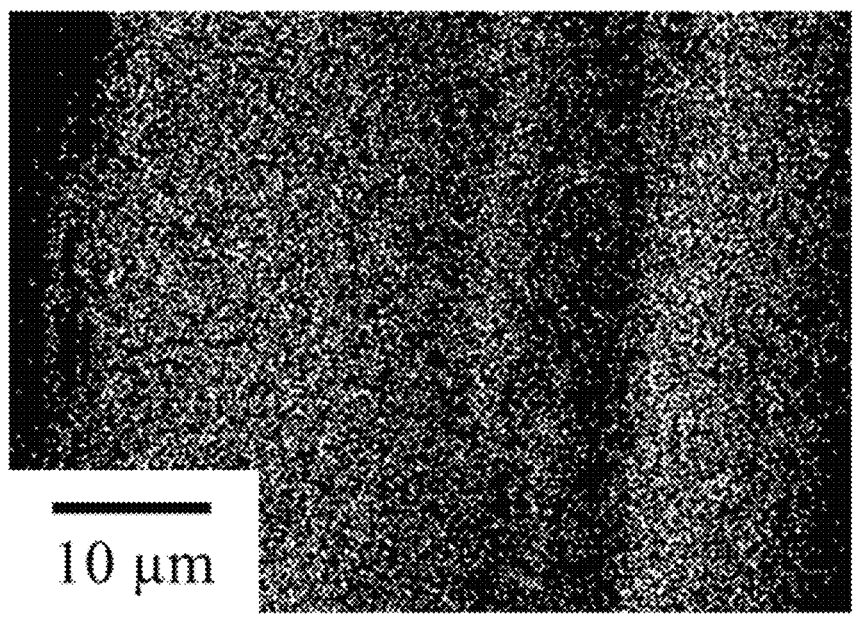
FIG. 3E shows the cross-section of FIG. 3C with an EDS carbon map.

In the fabrication process, sulfur was infused from one side of the CNF mat during rapid heat treatment such that the sulfur diffused throughout the thickness of the CNF. In higher magnification SEM micrographs from both the side of sulfur-infusion (FIG. 3A) and opposite side (FIG. 3B) exhibited sulfur deposited between nanofibers on both sides of the cathode. FIGS. 3C-3E show the cross-sectional SEM micrograph and corresponding sulfur and carbon EDS maps. The relatively uniform sulfur diffusion throughout the CNF mat demonstrated that large inter-fiber spacing inherent to CNFs provided vast open pathways for easy diffusion of the molten sulfur throughout the CNF mat.

Figure 4:
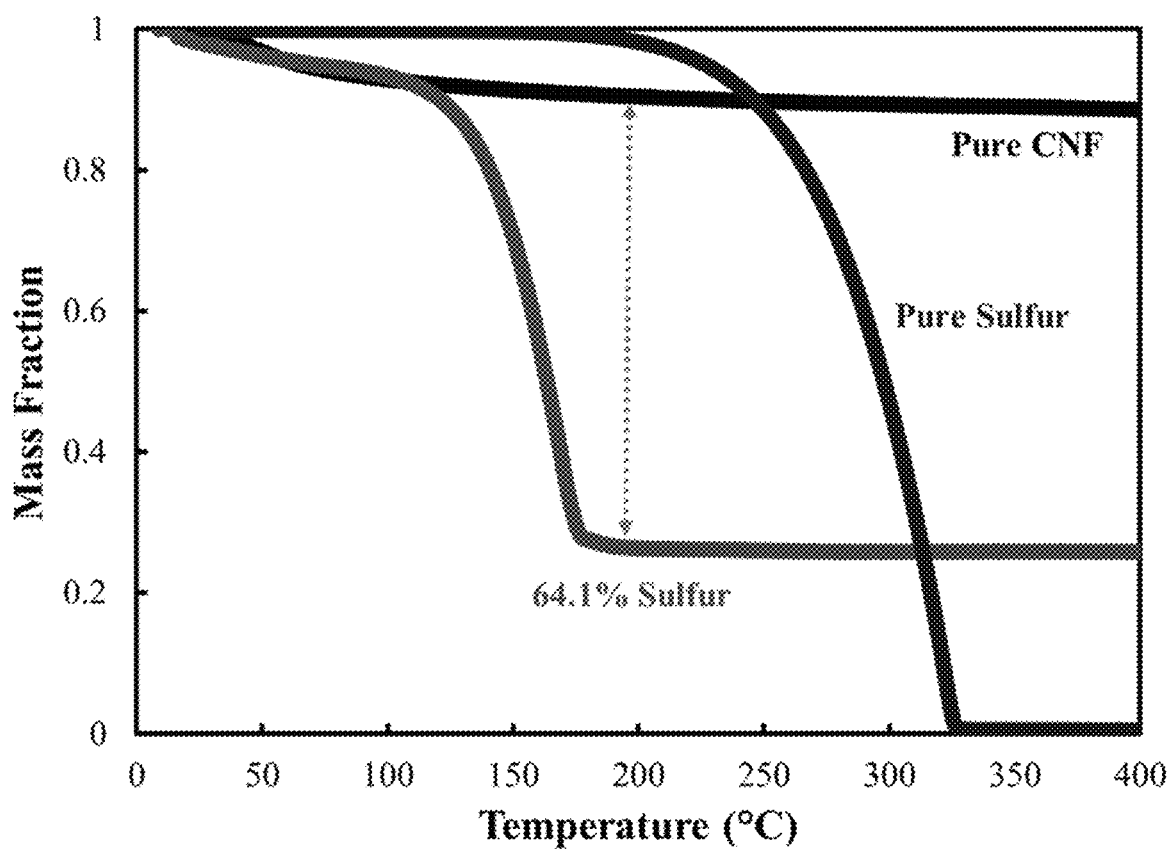
FIG. 4 shows a thermogravimetric analysis (TGA) of the pure sulfur and pure CNF substrate.
Figure 5:
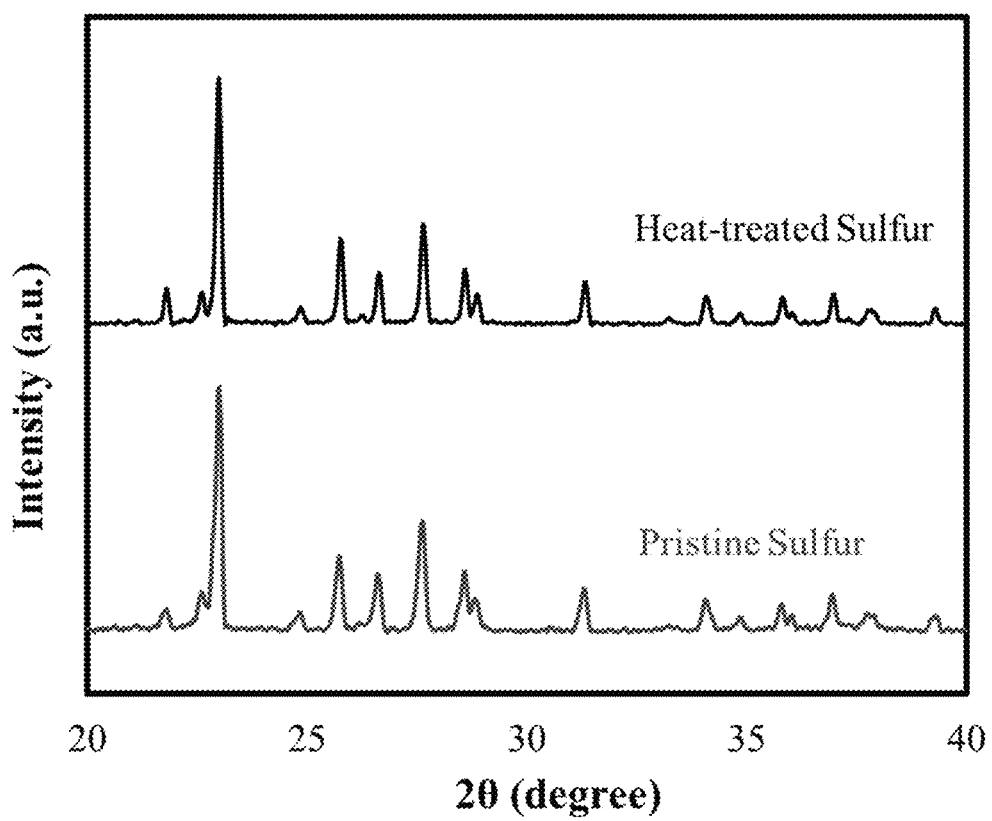
FIG. 5 shows X-ray diffraction (XRD) results of pure sulfur as purchased (pristine sulfur) and sulfur after heat treatment.

Thermogravimetric analysis confirmed the sulfur content in the S-CNF, as shown in FIG. 4. The TGA mass percent loss was in agreement with estimates based on the weights measured before and after heat treatment. Furthermore, rapid heat-press treatment did not alter the state of the sulfur as confirmed by XRD (see FIG. 5). The rapid melt technique therefor allows precise control of sulfur loading based solely on the amount of sulfur initially dispersed on the CNF mat prior to the heat-press treatment. High sulfur loadings can easily be achieved with this technique, with sulfur loadings as high as 90% being easily achieved.

Figure 6:
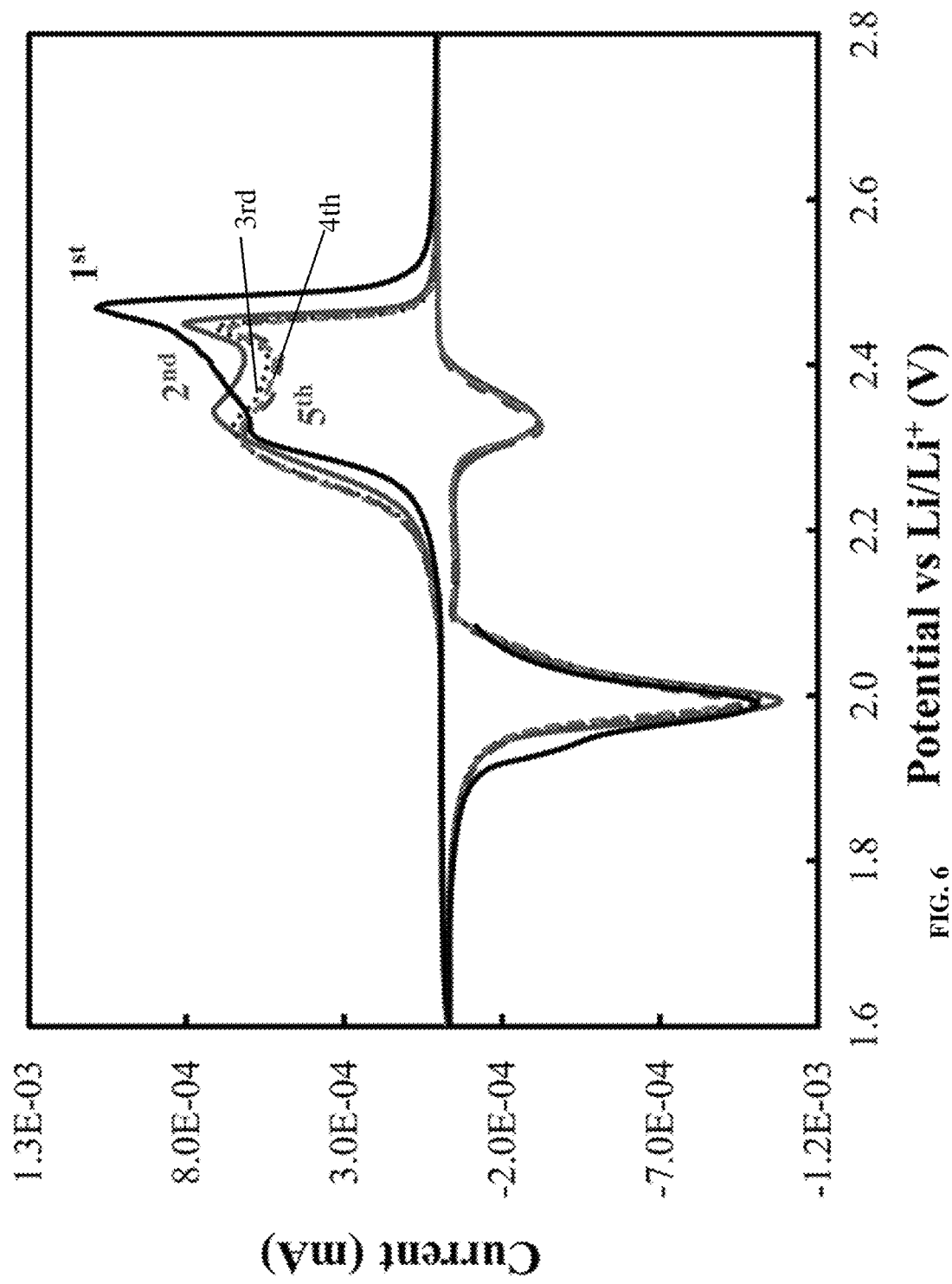
FIG. 6 shows cyclic voltammetry of the cathode of the invention over the first 5 cycles at a 0.05 mV s$^{-1}$ scan rate.

S-CNFs were used directly in coin cells for electrochemical characterization (FIG. 1B). In FIG. 6, cyclic voltammetry showed reduction and oxidation peaks characteristic of lithium-sulfur reactions in a Li—S battery. During discharge, the two reduction peaks observed at about 2.35V and about 2V correspond to $S_8$ reduction to higher order polysulfides and lower order polysulfides, respectively. Upon charging, the polysulfides undergo oxidation from insoluble, lower order polysulfides back to soluble, higher order polysulfides, and eventually $S_8$. During the first anodic scan, a sharp oxidation peak at about 2.45V showed a slight overpotential that decreases after subsequent cycles in which the peak broadens into two peaks between 2.3V and about 2.45V. This can be attributed to the rearrangement of sulfur during the first discharge-charge cycle to a more electrochemically favorable state.

Figure 7:
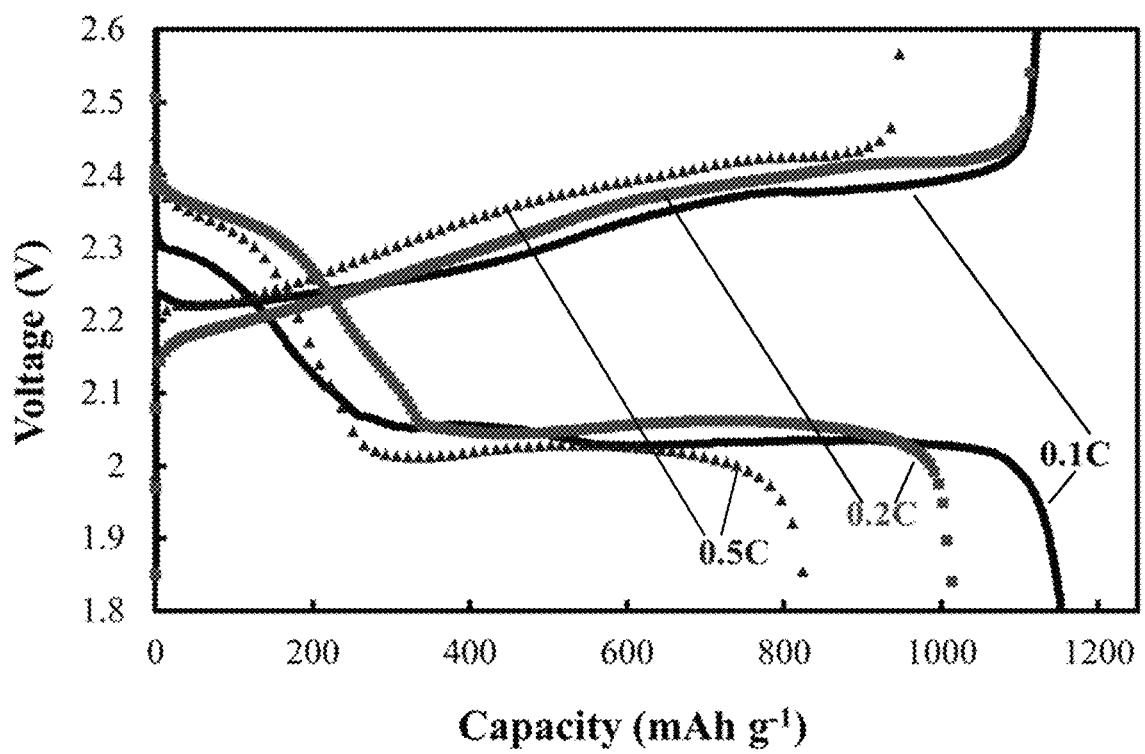
FIG. 7 shows charge-discharge curves of the cathode of the invention tested at 0.1 C, 0.2 C, and 0.5 C rates.
Figure 8:
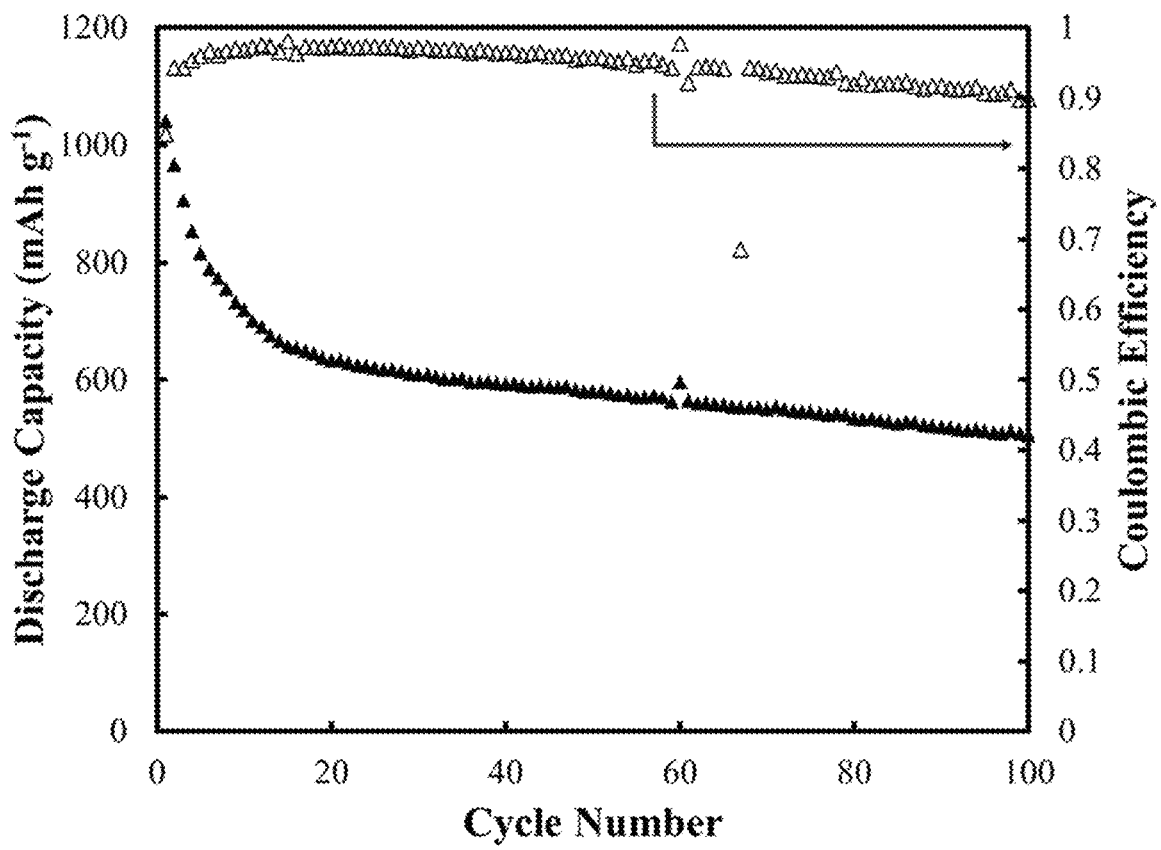
FIG. 8 shows cyclability of the cathode of the invention at a C rate of 0.1 C over 100 cycles.

Discharge-charge curves in FIG. 7 show high initial capacities of 1154 mAh $g^{-1}$, 1022 mAh $g^{-1}$, and 845 mAh $g^{-1}$ for cathodes cycled at 0.1 C, 0.2 C, and 0.5 C, respectively. The voltage plateaus in the discharge-charge curves were in agreement with the lithium-sulfur redox voltages seen before, again confirming Li—S reactions were occurring. For S-CNF at 0.1 C, there was much lower polarization. The charge and discharge capacities were nearly equal, which indicates highly reversible electrochemical reactions (high Coulombic efficiency). See FIG. 8. The Coulombic efficiency during the first cycle at higher C-rates decreased and the upper reduction potential slightly increased, possibly due to kinetic limitations during the first reduction of $S_8$/high-order polysulfides. To stabilize cells for long-term cycling, an initial conditioning cycle of 0.1 C and/or 0.2 C was performed before the final 0.2 C or 0.5 C rates, respectively.

Figure 9:
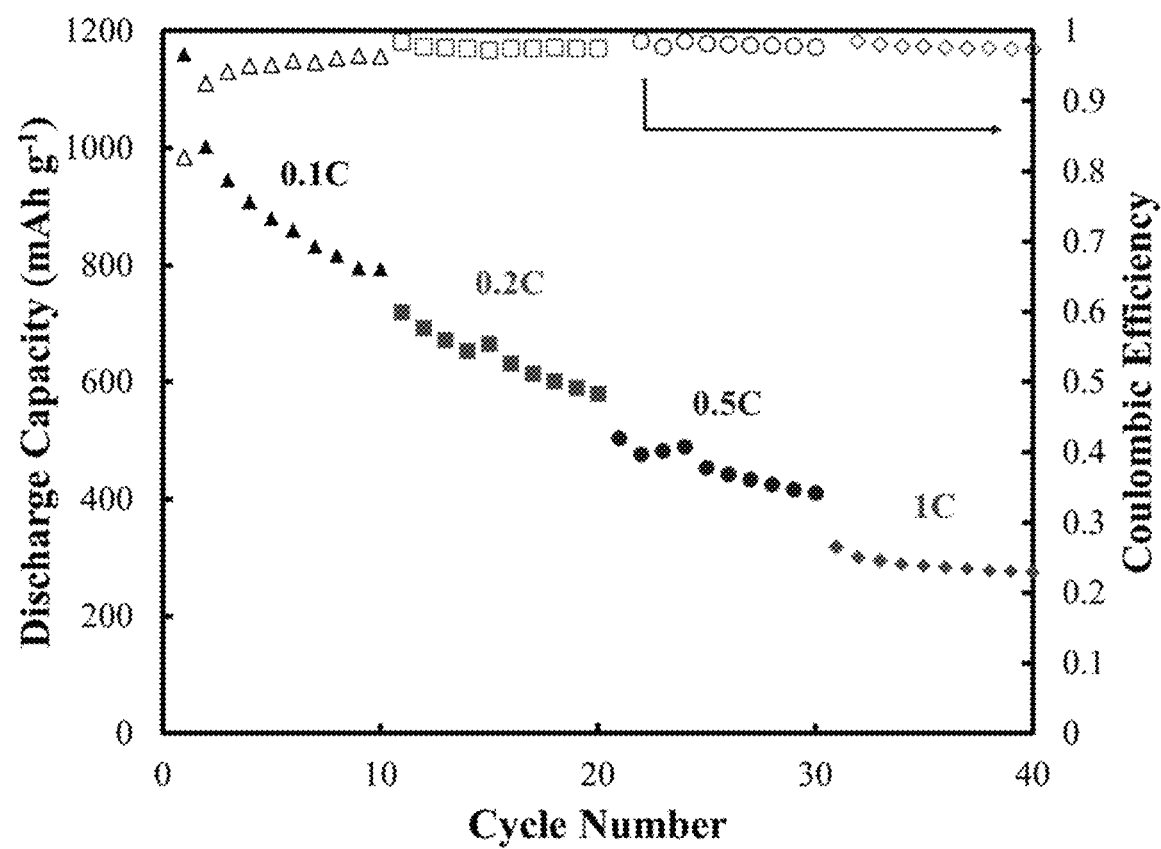
FIG. 9 shows rate capability of the cathode of the invention at C rates of 0.1 C, 0.2 C, 0.5 C and 1 C.

At a standard rate of 0.2 C, a discharge capacity of 1057 mAh $g^{-1}$ was obtained for S-CNF, as shown in FIG. 9. Following a similar trend as for the above-characterized cathodes at 0.1 C, the discharge capacity faded within 20 cycles to 665 mAh $g^{-1}$, and finally to 534 mAh $g^{-1}$ after 100 cycles. In the first 20 cycles, the average capacity fade rate was 2.4% per cycle. After 20 cycles, the average capacity fade rate was 0.3% per cycle, about an order of magnitude lower.

Figure 10:
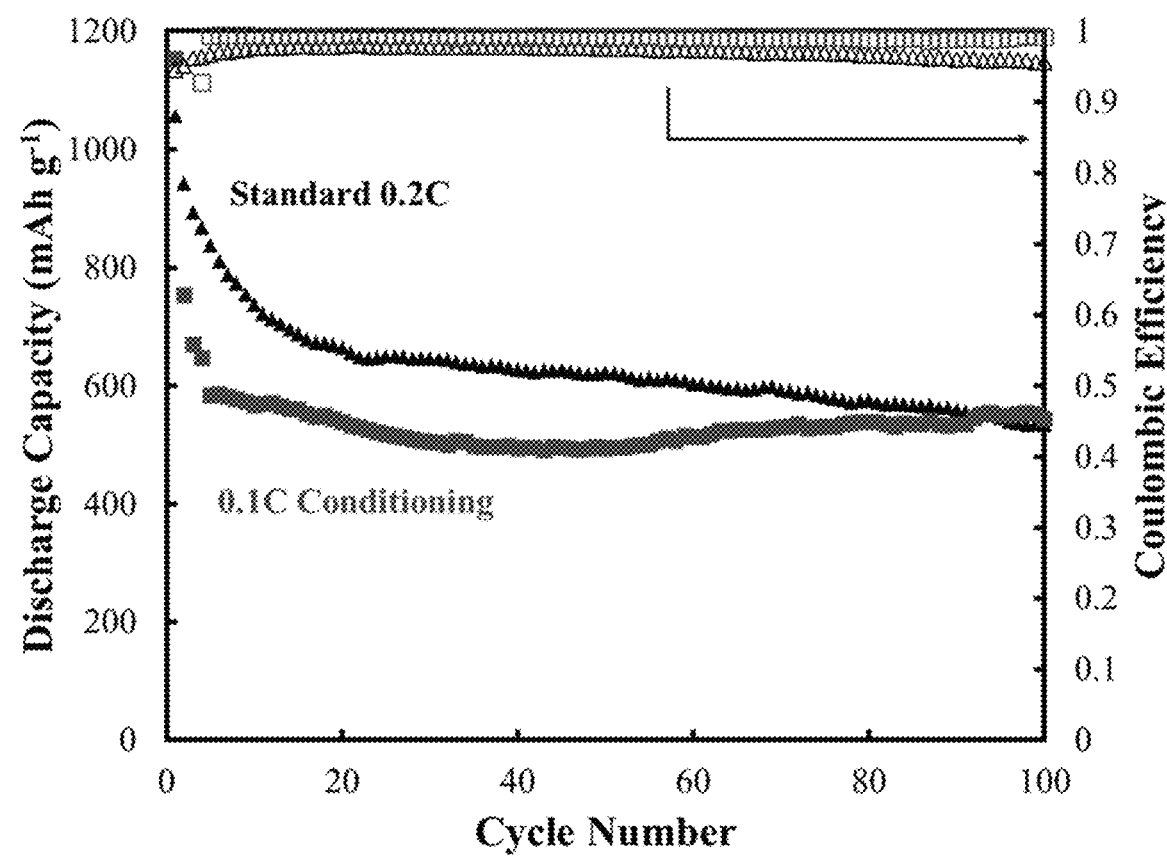
FIG. 10 shows the cyclability of the cathode of the invention at a standard 0.2 C rate and a 0.2 C rate with an initial conditioning cycle at 0.1 C.
Figure 11:
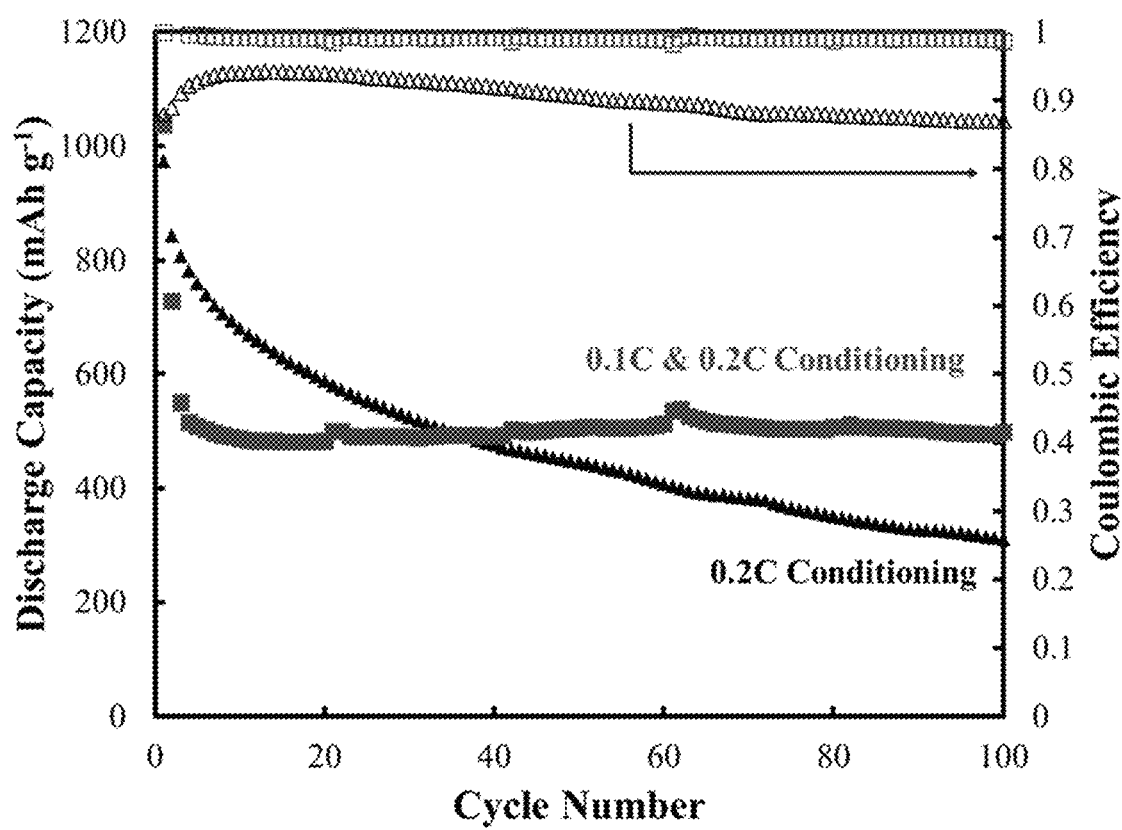
FIG. 11 shows the cyclability of the cathode of the invention at a standard 0.5 C rate and a 0.5 C rate with an initial conditioning cycle at 0.2 C or initial conditioning cycles at 0.1 C and 0.2 C.

In an attempt to limit the large capacity drop to just a few cycles, the S-CNF cathodes were tested with a conditioning cycle, as shown in red in FIG. 10. This S-CNF cathode was conditioned at 0.1 C for the first cycle, then 0.2 C for all subsequent cycles. The discharge capacity for conditioned cathode run at a rate of 0.2 C was just 755 mAh $g^{-1}$, but the conditioning provided a rapidly equilibrated discharge capacity within 3 cycles. The discharge capacity stabilized to 584 mAh $g^{-1}$, beyond which 93% of that capacity was retained after 100 cycles, with an average capacity fade of only 0.37% per cycle and >99% average Coulombic efficiency The capabilities of the S-CNF cathode were further demonstrated at a rate of 0.5 C with using similar conditioning methods. In FIG. 11, S-CNF cathodes were tested at rate of 0.5 C after either a preliminary single-step conditioning or a two-step conditioning involving (i) an initial cycle at 0.2 C (black) and (ii) an additional primary cycle at 0.1 C plus a secondary conditioning cycle at 0.2 C (red). The impact of conditioning becomes apparent at faster discharge-charge rates, for which two-step conditioning stabilizes the cell almost immediately, whereas single-step conditioning still results in a slow, but relatively large capacity fade. For the single-step conditioning, the initial 0.5 C discharge capacity was 845 mAh $g^{-1}$. Within 20 cycles, the capacity retention was only 69% with a 93.4% Coulombic efficiency. After 100 discharge-charge cycles, the discharge capacity was only 310 mAh $g^{-1}$, roughly a 37% retention.

Figure 12:
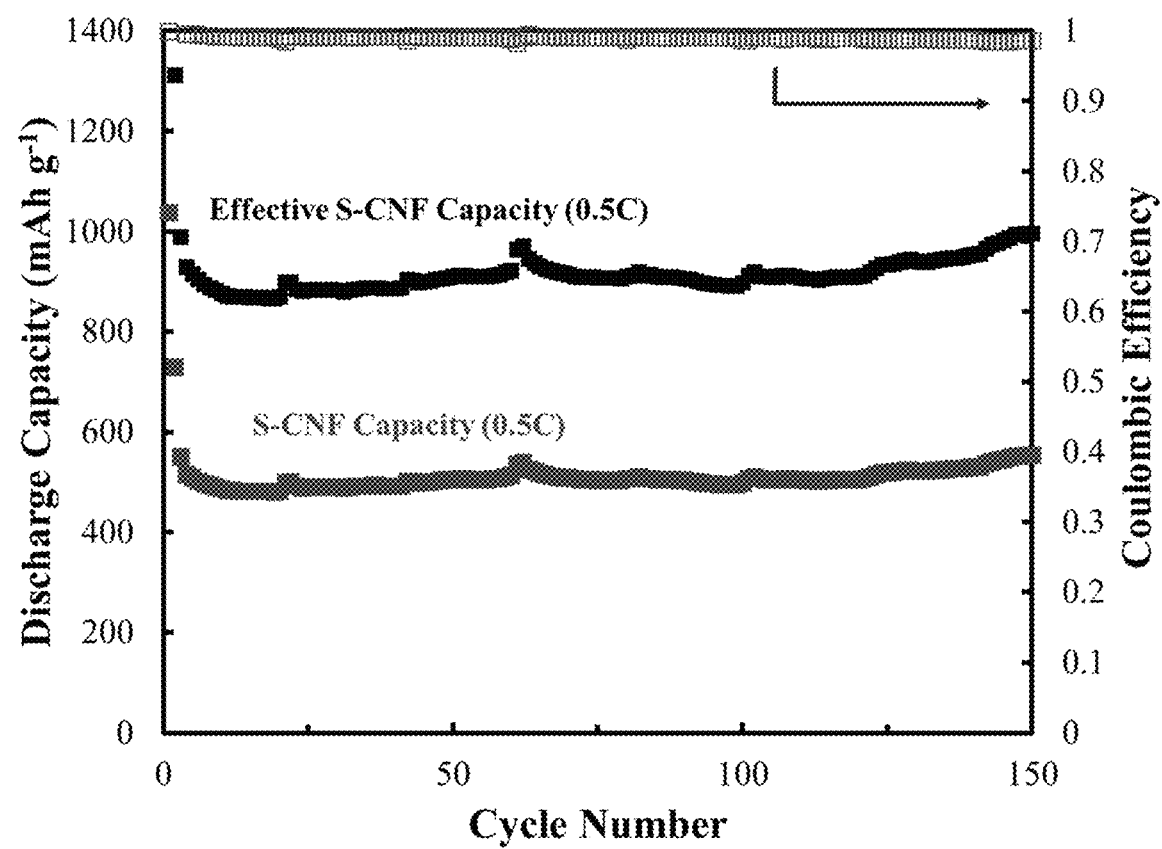
FIG. 12 shows the long term cycling capacity and effective capacity of conditioned cathode of the invention at a 0.5 C rate.

With a two-step conditioning, S-CNF cathodes produced a discharge capacity of 550 mAh $g^{-1}$ at 0.5 C with 100% retention and an average Coulombic efficiency of >99% over 150 cycles. The low discharge capacity at the 0.5 C rate (<40% of the theoretical maximum) showed relatively poor utilization of the sulfur, but provided excellent cycling stability over many cycles. With a >99% Coulombic efficiency and a steadily increased discharge capacity, the two-step conditioned S-CNF cathode cycled at 0.5 C showed an improvement in sulfur utilization over 150 cycles. To better compare to the structures in literature in which current collectors are used, a calculation for the effective capacity (shown below), is also plotted in FIG. 12, and demonstrates that effective capacity is nearly about 1000 mAh $g^{-1}$.

Effective Capacity Calculations

On average, sulfur composites cathodes are combined with additives have a resulting sulfur composition of 50-70 wt. % and about 1-2 mg $cm^{-2}$. For comparison, we assume 60% and 1.5 mg $cm^{-2}$ loading, thus the weight of the cathode (sulfur and additives) would be:

$$\text{Cathode weight: } \frac{1.5 \text{ mg}_{S8}}{60 \text{ wt \%}} = 2.5 \text{ mg}_{cathode}$$

With a conservative estimate of about 2 mg cm$^{-2}$ for the current collector, the total weight of cathode and current collector:

$$2.5\ mg_{cathode} + 2.0\ mg_{current\ collector} = 4.5\ mg_{total}$$

If the capacity of such cathodes is about 1000 mAh g$^{-1}_{(sulfur)}$, the capacity equivalent {mAh g$^{-1}_{(total=cathode+current\ collector)}$} based on the cathode and current collector would be:

$$\frac{1000\ mAh}{g_{S8}} \times \frac{1.5\ mg_{S8}}{4.5\ mg_{total}} = 333.3\ mAh\ g^{-1}_{total}$$

For the S-CNF cathodes of the present invention with 60 wt. % sulfur and 1.5 mg cm$^{-2}$ loading, the only components are sulfur and CNF, which serves as a current collector. The average discharge capacity based on sulfur mass is 550 mAh g$^{-1}$. Based on the same calculations shown above, the equivalent capacity would be:

$$\frac{550\ mAh}{g_{S8}} \times \frac{1.5\ mg_{S8}}{2.5\ mg_{total}} = 330\ mAh\ g^{-1}_{total}$$

Thus, the effective capacity ratio comparing our cathodes to standard (slurry-based) cathodes would be about 1.8, as shown below:

$$\frac{1000\ mAh\ g^{-1}_{S8@std}}{550\ mAh\ g^{-1}_{S8@SCNF}} \times \frac{330\ mAh\ g^{-1}_{total@SCNF}}{333.3\ mAh\ g^{-1}_{total@std}} = \sim 1.8$$

Therefore, the effective discharge capacity for an S-CNF cathode exhibiting 550 mAh g$^{-1}_{sulfur}$ would be about 991 mAh g$^{-1}$.

The initial drop in discharge capacity during the first 3 cycles can be attributed to large sulfur particles in which only the $S_8$ molecules on the surface of the particles are accessible. The rapidly equilibrated discharge capacity and excellent cycling stability demonstrate polysulfide blocking. It is believed that the highly stable performance after conditioning results from the CNF host, which provides both a physical blocking mechanism as well as a chemical affinity mechanism to polysulfides. Previous works have demonstrated great enhancement in performance by simply inserting interlayers, such the CNF, between the cathode and separator thereby creating a physical barrier.

Figure 13:
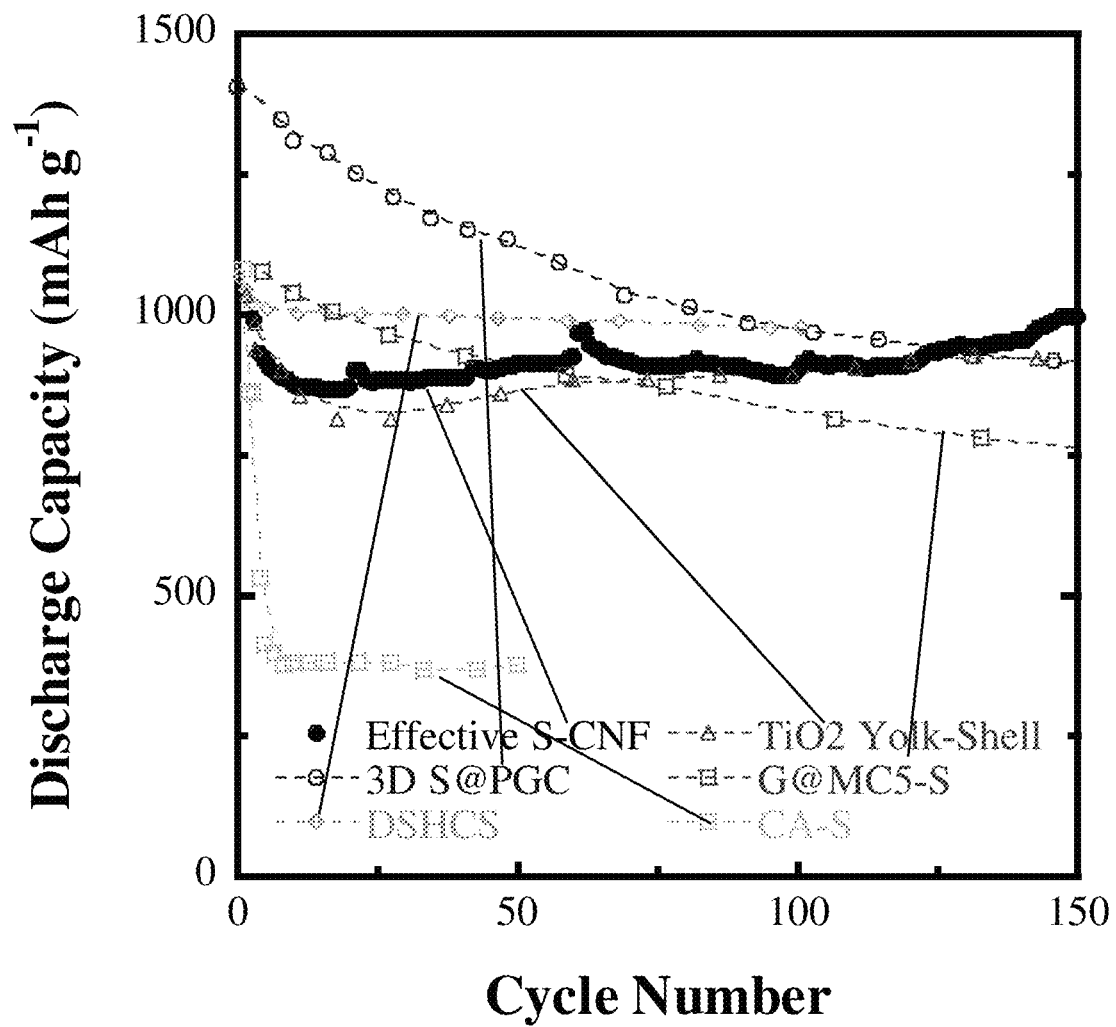
FIG. 13 shows long term cycling effective discharge capacity accounting for the current collector using cathodes disclosed in the literature, which require slurry-processing and long sulfur deposition period. All data were generated at 0.5 C rate.

To compare the performance of the S-CNF cathodes of the present invention with a majority of structures in the literature, the simplified construction of the S-CNF cathodes must be taken into account. As previously mentioned, the CNFs provide continuous conductive pathways, which allows both the binders and the heavy metal current collector to be eliminated. For example, the current collector for an average Li—S cathode with a 1.5 mg cm$^{-2}$ sulfur loading (about 60 wt. % S in C/S cathode), would conservatively make up close to 50% of the electrode weight. Therefore, the long-term cycling data for S-CNF tested at 0.5 C was translated into effective capacity for rational comparison with literature in which nanostructured cathodes undergo slurry-based processing onto an additional current collector. Other cathodes that require such construction are overlaid in FIG. 13 for direct comparison with the adjusted capacity estimate (all at 0.5 C rates). By a conservative estimate (see supporting calculation above), the effective capacity of the S-CNF was demonstrated to be 997 mAh g$^{-1}$ after 150 cycles at 0.5 C. Not only does the literature require slurry-processing and current collectors, but also very long sulfur deposition times: e.g. a 20 hour melt-diffusion deposition, a 40 hour solution-based deposition, a 16 hour two-step melt-diffusion deposition, a 4 hour solution-based deposition, and a 12 h melt-diffusion deposition. See Z. Li, X. Li, Y. Liao, X. Li and W. Li, *Journal of Power Sources*, 2016, 334, 23-30; G. Li, J. Sun, W. Hou, S. Jiang, Y. Huang and J. Geng, *Nature Communications*, 2016, 7, 10601; N. W. Li, Y. X. Yin and Y. G. Guo, *RSC Advances*, 2016, 6, 617-622; and Z. Wei Seh, W. Li, J. J. Cha, G. Zheng, Y. Yang, M. T. McDowell, P. C. Hsu and Y. Cui, *Nature Communications*, 2013, 4, 1331; and C. Zhang, H. B. Wu, C. Yuan, Z. Guo and X. W. Lou, *Angewandte Chemie*, 2012, 124, 9730-9733. Therefore, the simplified nature of the S-CNF fabrication could be very important in practical manufacturing of Li—S batteries especially when comparing the data based on the elimination of the dead-weight of the current collector.

Figure 14A:
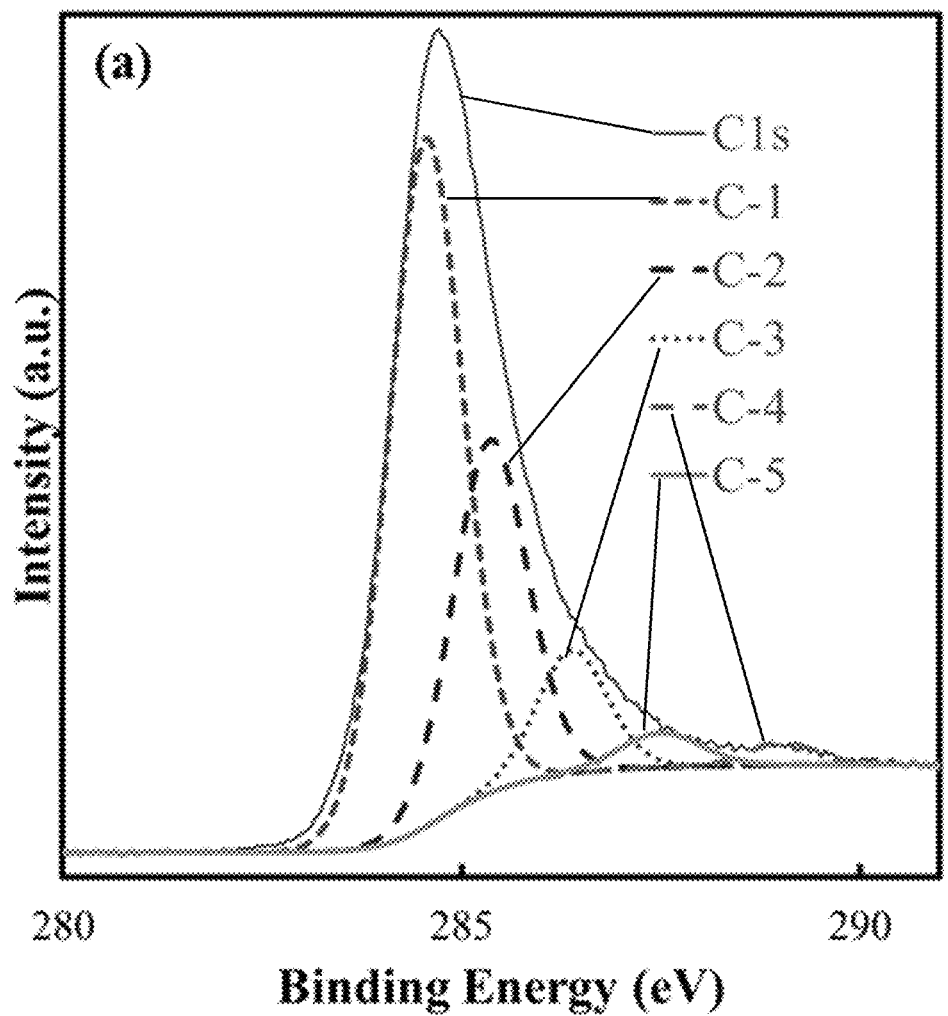
FIGS. 14A-14C show deconvoluted X-ray photoelectron spectroscopy (XPS) spectra of C, N, and O respectively for the cathode of the present invention.
Figure 14B:
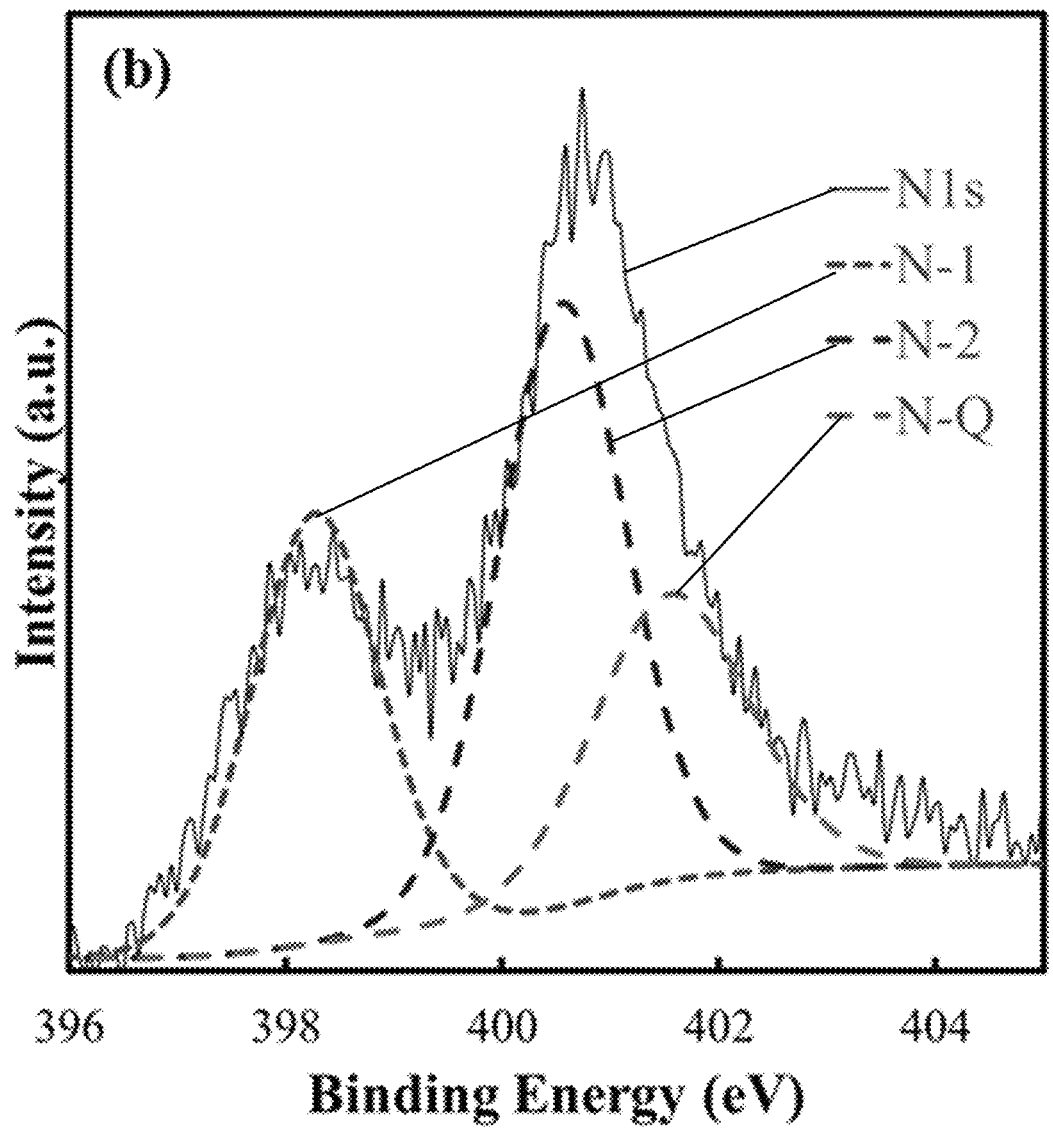
Figure 14C:
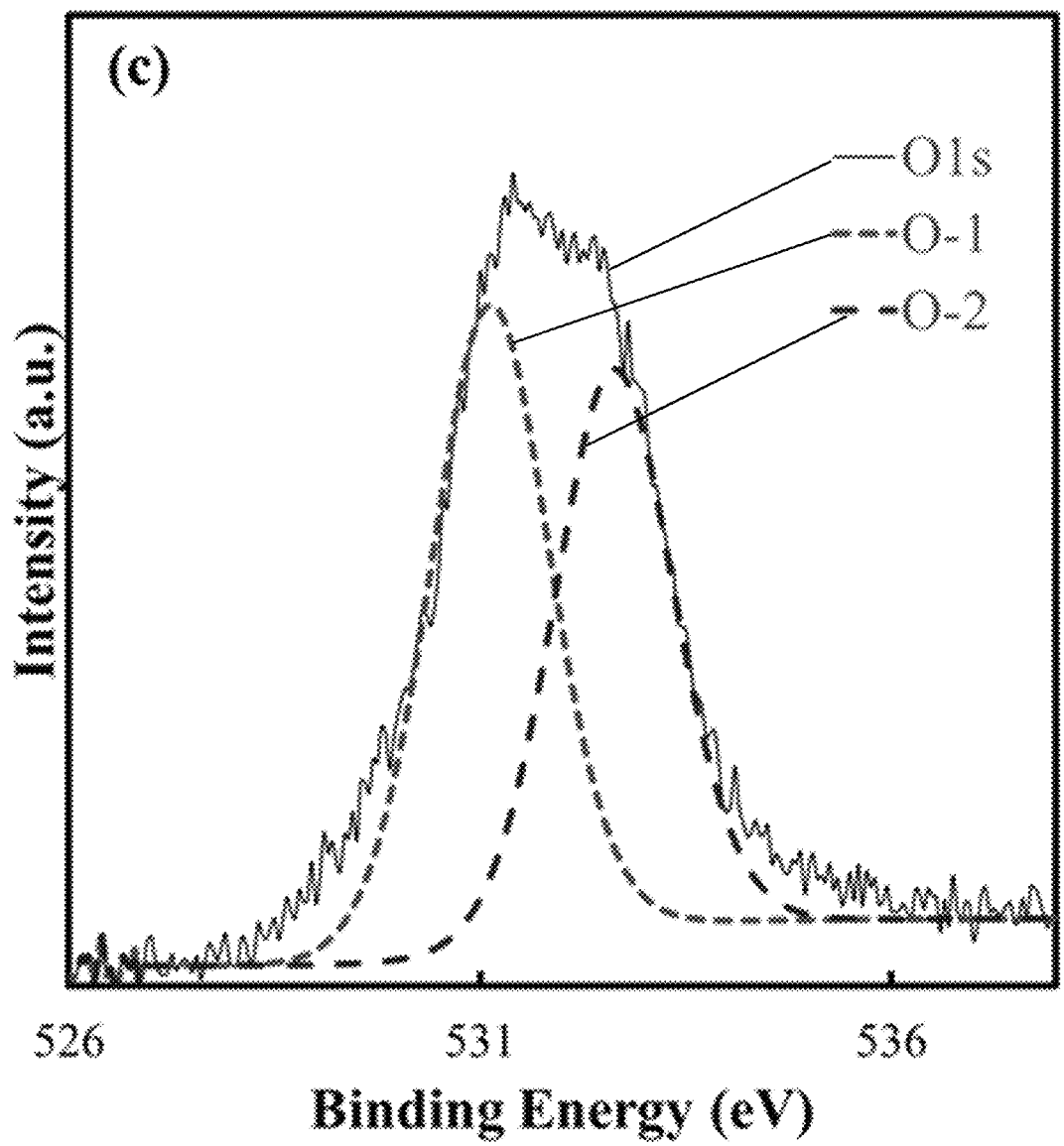

Moreover, studies using DFT calculations have shown that polysulfides have a much greater affinity for functional groups rather than pure carbon. During PAN stabilization, the polymer chains undergo oxidation and cyclization reactions to form a ladder structure. Upon further heat treatment, deaminization of the ladder structure yields pure carbonized nanofibers. However, due to incomplete reactions, the CNF still contains some functional groups along the surface. Using XPS, the final CNF composition was determined to contain 89% carbon, 5% nitrogen, and 6% oxygen, as summarized in Table 1. The deconvoluted C1s, N1s, and O1s peaks for CNFs are shown in FIGS. 14A-14C and the contributions from each functional species are summarized in Table 1.

TABLE 1

Summary of the high resolution XPS C 1s, N 1s, and O 1s spectra of the electrospun CNFs and composition (%).

| Carbon 89% | eV | % | Nitrogen 5% | eV | % | Oxygen 6% | eV | % |
|---|---|---|---|---|---|---|---|---|
| C—C/C=C | 284.6 | 56.5 | C—N=C | 398.3 | 31.1 | O=R | 531.1 | 53.5 |
| C=N | 285.4 | 29.1 | C—N=C/N—H | 400.6 | 43.8 | R—O—R | 532.6 | 46.5 |
| C—O | 286.4 | 9.6 | Quaternary | 401.6 | 25.1 | | | |
| C=O | 287.5 | 3.1 | | | | | | |
| O—C=O | 289.0 | 1.7 | | | | | | |

Based on XPS, the CNF composition contains 89% carbon, 5% nitrogen, and 6% oxygen. The deconvoluted C 1s, N 1s, and O 1s peaks for CNFs are shown in FIG. 14A-14C respectively and the contributions from each functional species are summarized in Table 1. The functional groups present in the CNF samples might serve to attract polysulfides, for chemical adsorption on the non-porous CNF surface, which benefits the long term reversibility of the S-CNF cathodes. Within the carbon portion of the CNF material, only about 57% is graphitic carbon (—C—C—/—C=C—, 285 eV), meaning more than 40% of the carbon functional groups present have greater polysulfide interactions (i.e. polysulfide binding energy >0.55 eV). Moreover, numerous studies have shown the relatively high chemical affinity of polysulfides to oxygen and nitrogen groups (among others) with respect to pure carbon. See H. J. Peng, T. Z. Hou, Q. Zhang, J. Q. Huang, X. B. Cheng, M. Q. Guo, Z. Yuan, L. Y. He and F. Wei, *Advanced Materials Interfaces*, 2014, 1; Q. Pang, X. Liang, C. Y. Kwok and L. F. Nazar, *Journal of The Electrochemical Society*, 2015, 162, A2567-A2576; L. Ma, H. L. Zhuang, S. Wei, K. E. Hendrickson, M. S. Kim, G. Cohn, R. G. Hennig and L. A. Archer, *ACS Nano*, 2016, 10, 1050-1059; J. Song, T. Xu, M. L. Gordin, P. Zhu, D. Lv, Y. B. Jiang, Y. Chen, Y. Duan and D. Wang, *Advanced Functional Materials*, 2014, 24, 1243-1250; K. A. See, Y. S. Jun, J. A. Gerbec, J. K. Sprafke, F. Wudl, G. D. Stucky and R. Seshadri, *ACS Applied Materials & Interfaces*, 2014, 6, 10908-10916; G. Zhou, L. C. Yin, D. W. Wang, L. Li, S. Pei, I. R. Gentle, F. Li and H. M. Cheng, *ACS Nano*, 2013, 7, 5367-5375. For example, about 75% of the nitrogen in the CNFs used on our work correspond to pyridine functionalities (about 398 and about 400 eV). See D. W. Wang, F. Li, L. C. Yin, X. Lu, Z.-G. Chen, I. R. Gentle, G. Q. Lu and H. M. Cheng, *Chemistry—A European Journal*, 2012, 18, 5345-5351. DFT calculations by Peng et al showed pyridine groups have twice the binding energy with soluble polysulfides as graphitic carbon, most likely due to the lone electron pair that $Li^+$ ions directly binding to the electron-rich nitrogen atom. See H. J. Peng, T. Z. Hou, Q. Zhang, J. Q. Huang, X. B. Cheng, M. Q. Guo, Z. Yuan, L. Y. He and F. Wei, *Advanced Materials Interfaces*, 2014, 1. Moreover, oxygen functional groups show greater affinity to polysulfides compared to graphitic carbons. See G. Zhou, L. C. Yin, D. W. Wang, L. Li, S. Pei, I. R. Gentle, F. Li and H. M. Cheng, *ACS Nano*, 2013, 7, 5367-5375; and H. J. Peng, J. Q. Huang, M. Q. Zhao, Q. Zhang, X. B. Cheng, X. Y. Liu, W. Z. Qian and F. Wei, *Advanced Functional Materials*, 2014, 24, 2772-2781.

Figure 15:
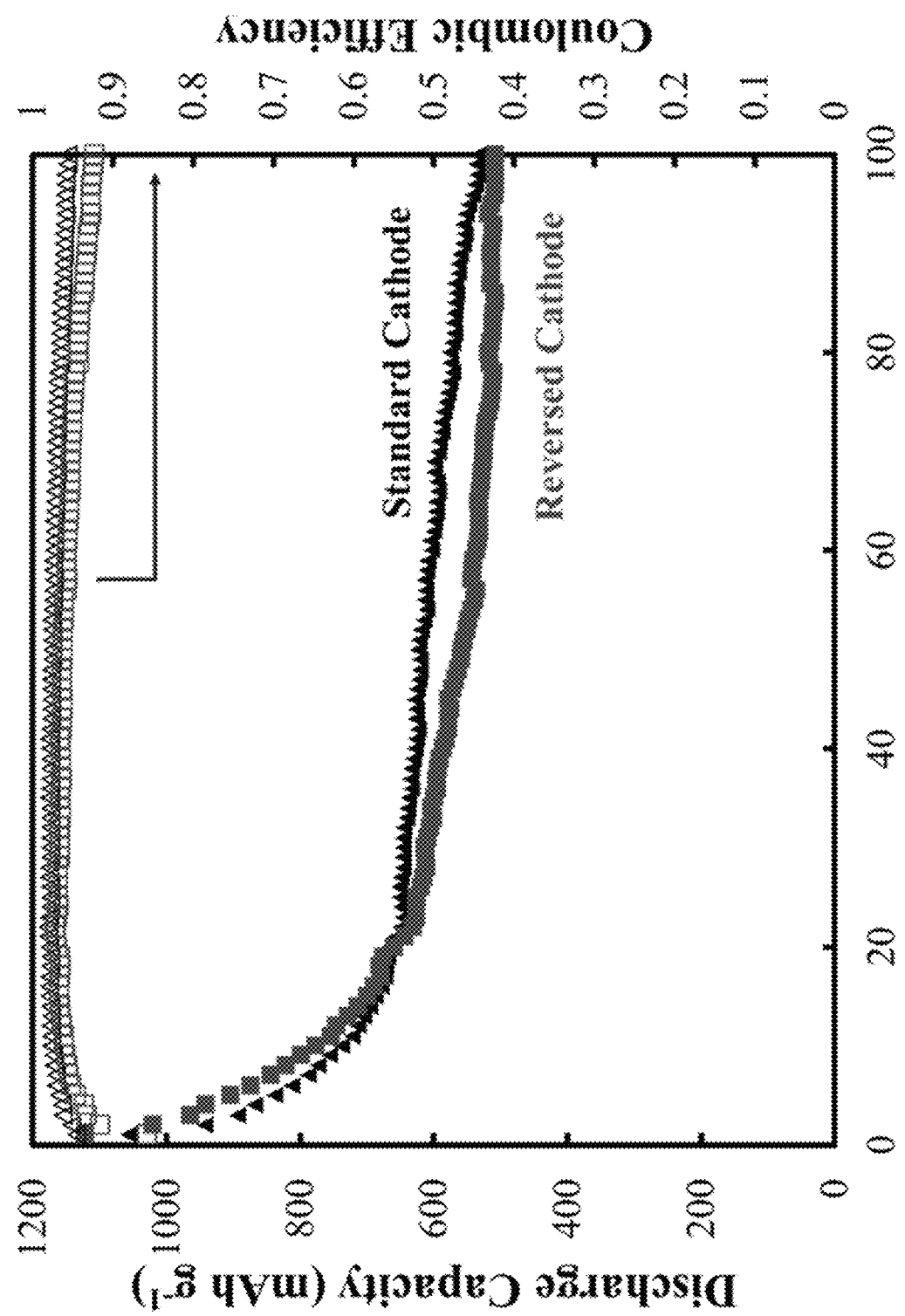
FIG. 15 shows the cycling performance of a standard cathode cell assembly and a reversed cathode cell assembly, respectively, at a 0.2 C rate.
Figure 16A:
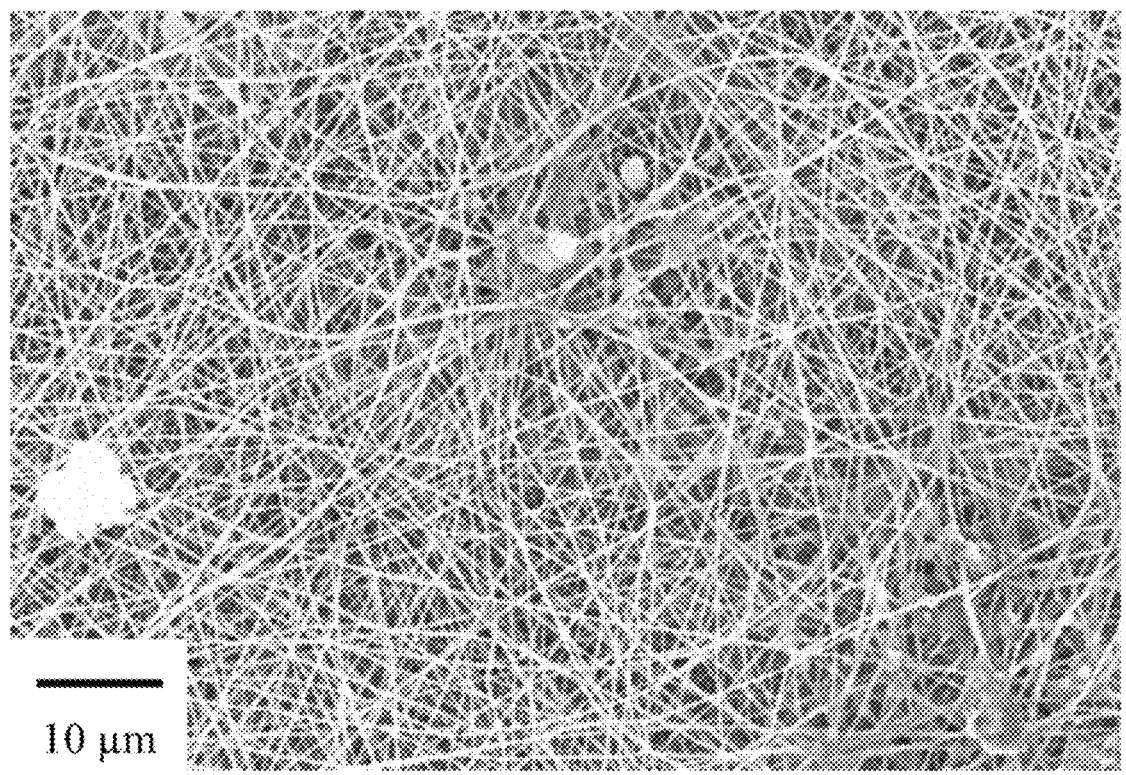
FIG. 16A shows the SEM image of the cathode of present invention on the side from which sulfur was infused.
Figure 16B:
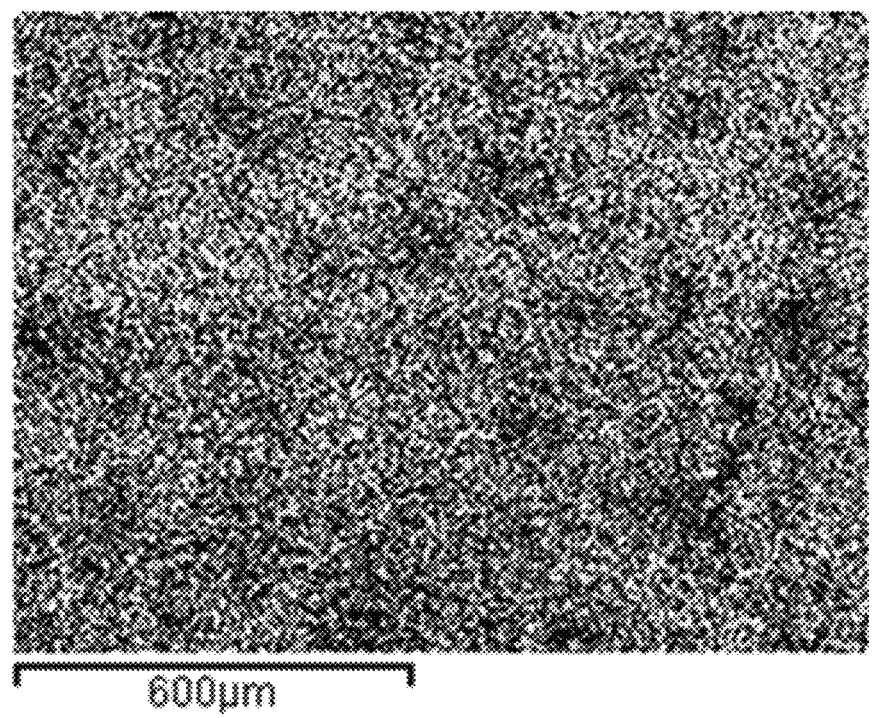
FIG. 16B shows and the corresponding sulfur EDS map of the cathode of FIG. 16A.
Figure 16C:
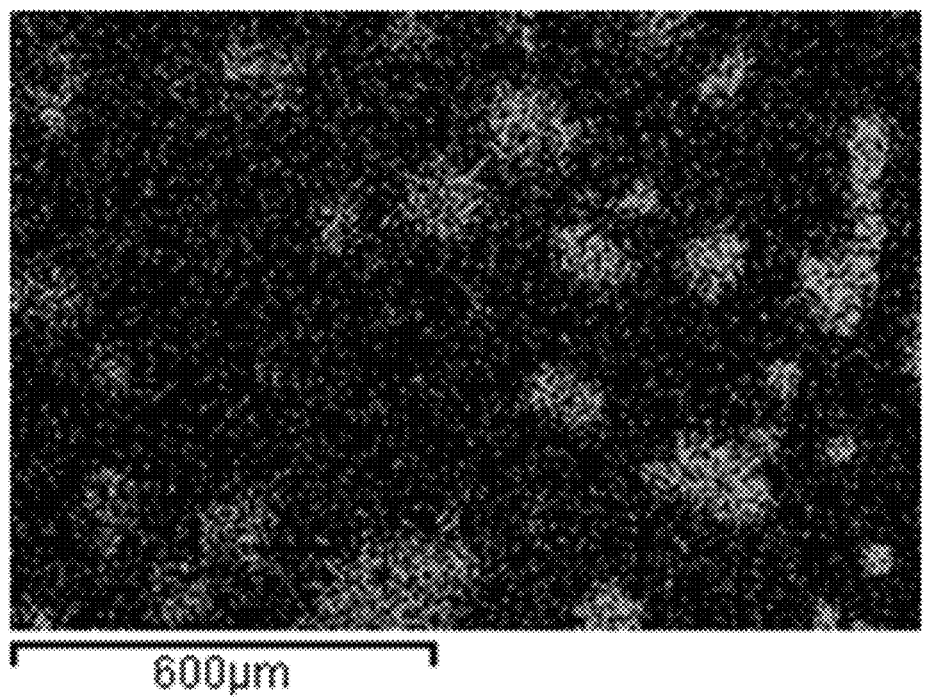
FIG. 16C shows the corresponding carbon EDS map of the cathode of FIG. 16A.
Figure 17A:
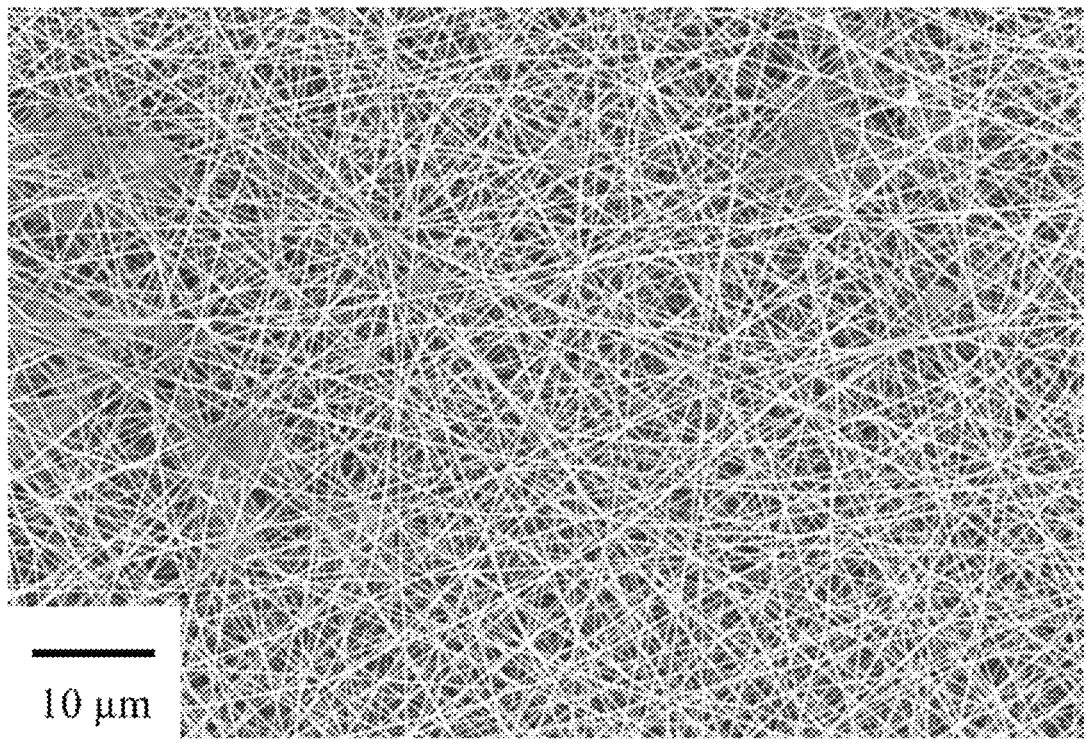
FIG. 17A shows the SEM image of the cathode on the side opposite of the side from which sulfur was infused.
Figure 17B:
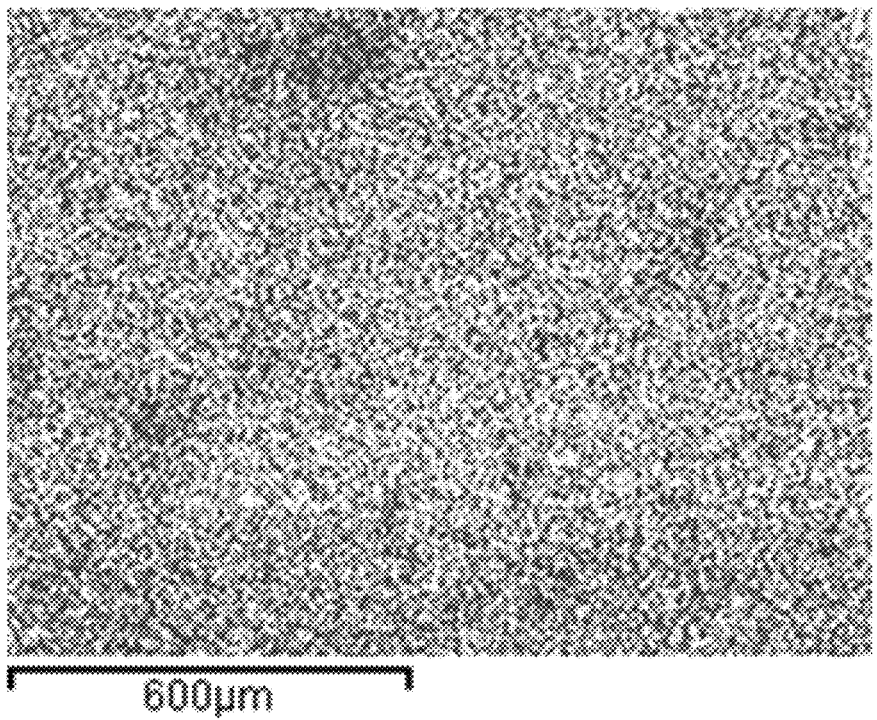
FIG. 17B shows the corresponding sulfur EDS map of the cathode of FIG. 17A.
Figure 17C:
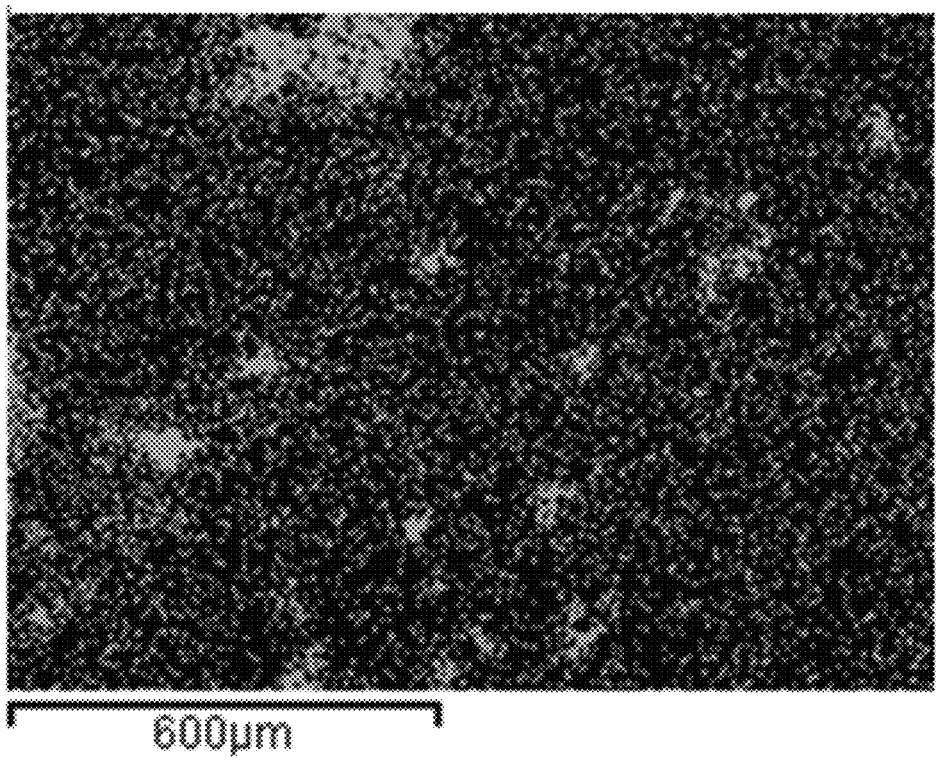
FIG. 17C shows the corresponding carbon EDS map of the cathode of FIG. 17A.
Figure 18A:
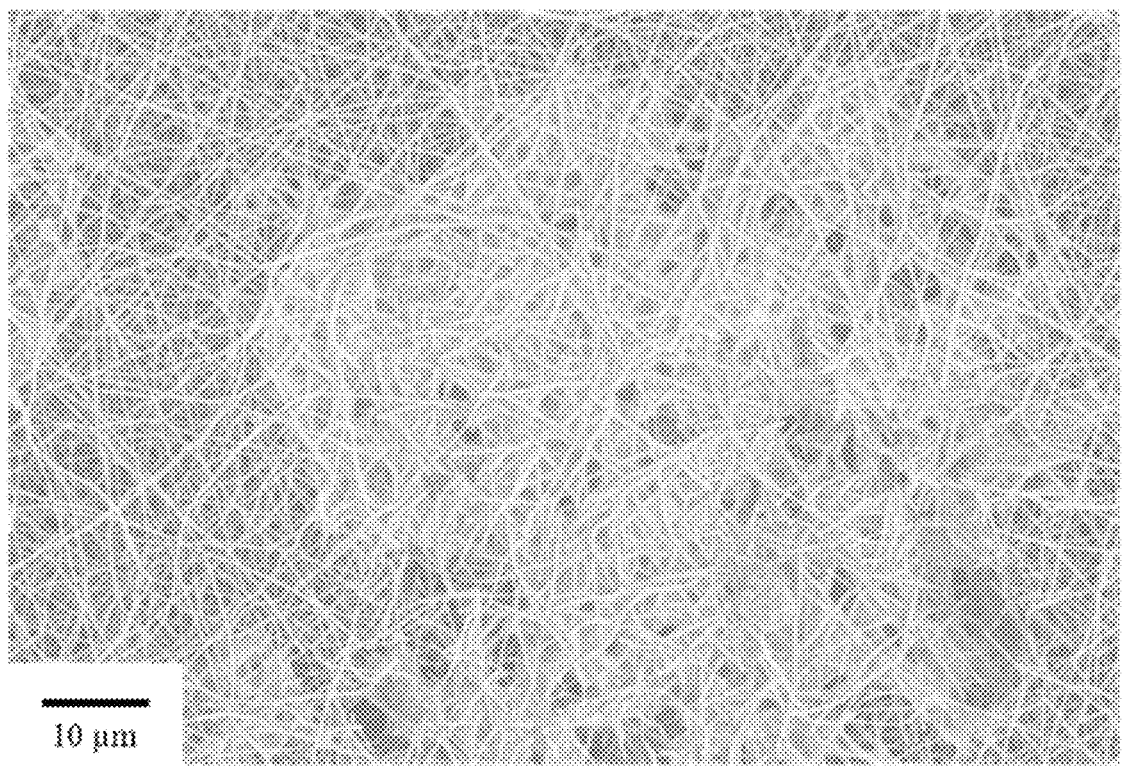
FIG. 18A shows the SEM image of the cathode on the side from which sulfur was infused after 15 seconds heating.
Figure 18B:
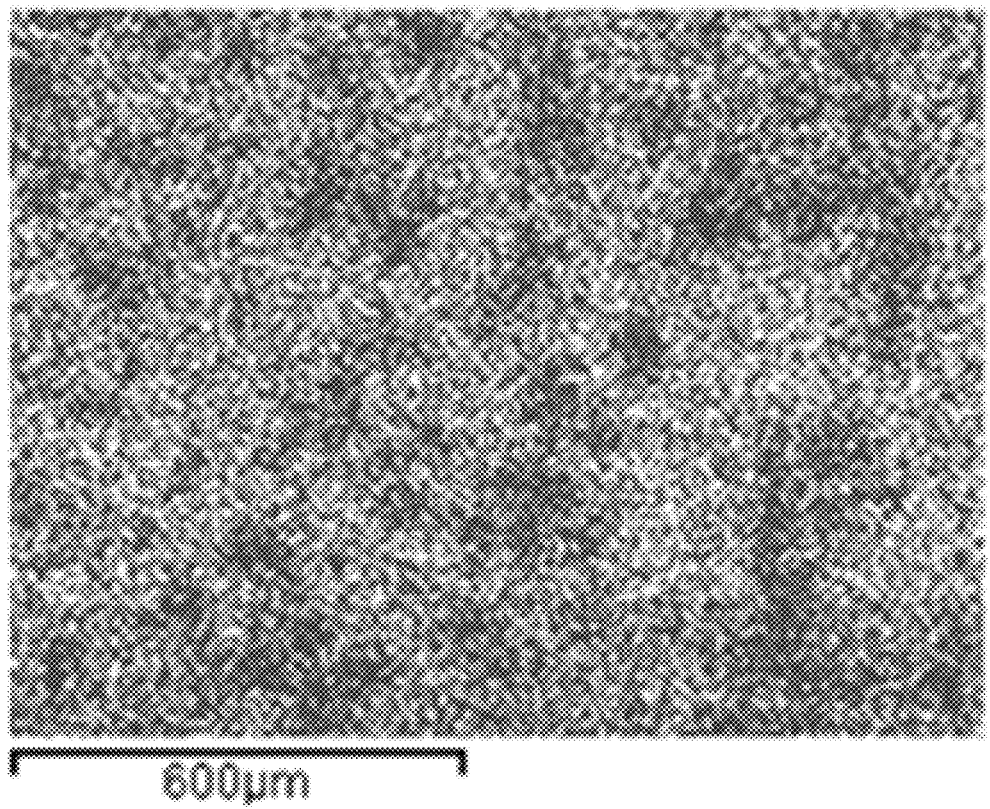
FIG. 18B shows the corresponding sulfur EDS map of the cathode of FIG. 18A.
Figure 18C:
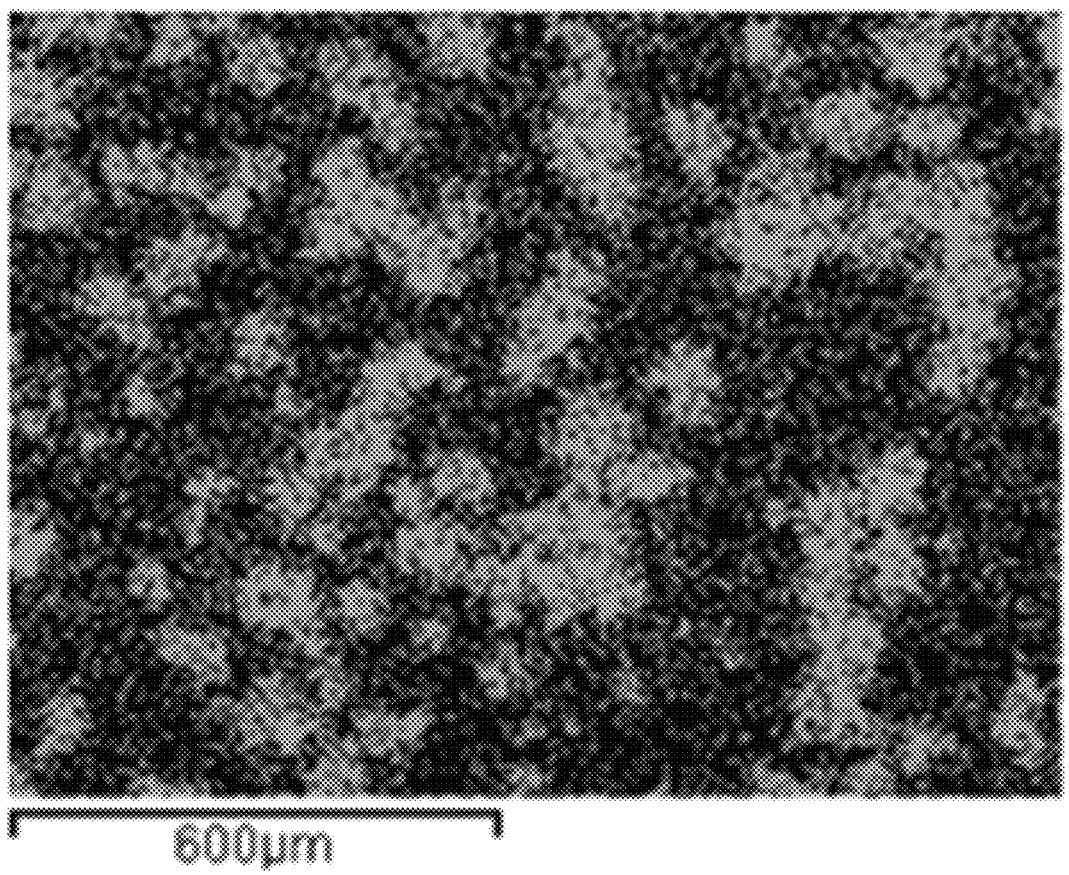
FIG. 18C shows the corresponding carbon EDS map of the cathode of FIG. 18A.
Figure 19A:
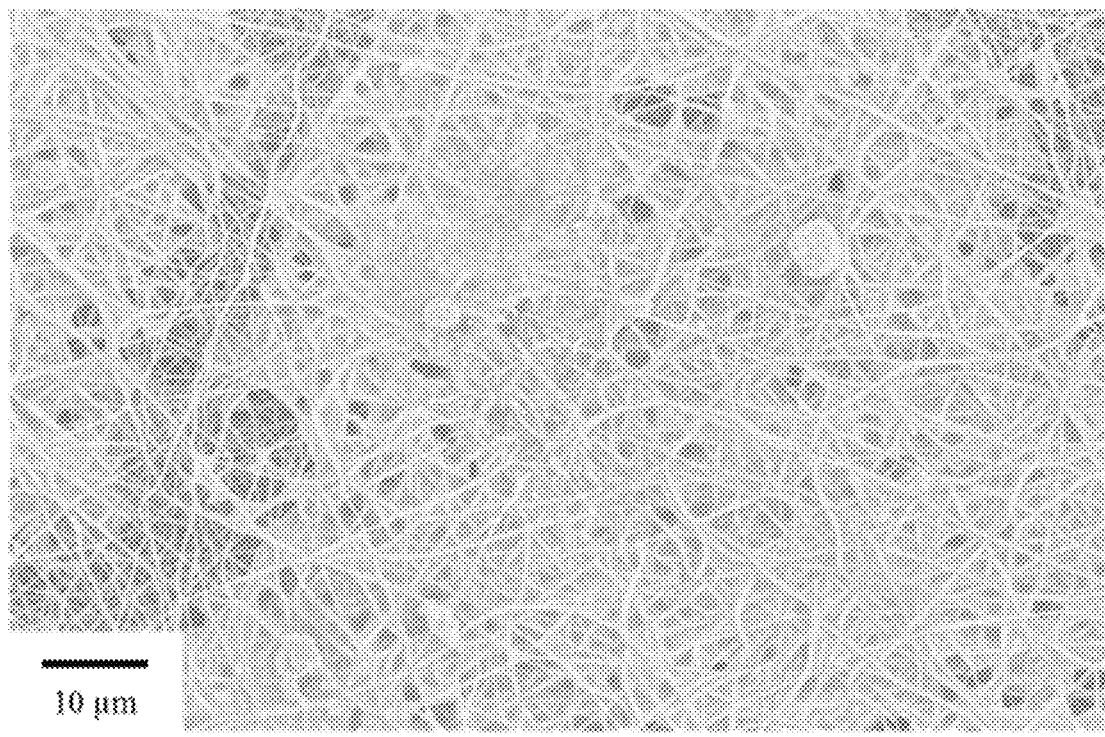
FIG. 19A shows the SEM image of the cathode on the side from which sulfur was infused after 30 seconds heating.
Figure 19B:
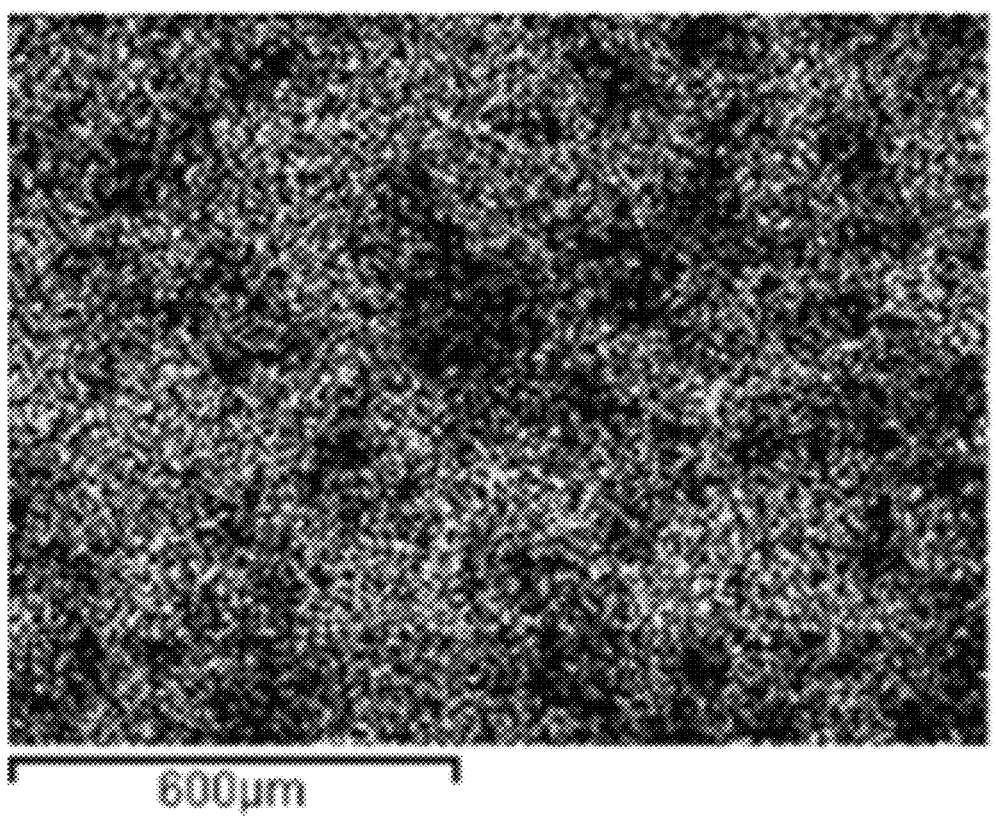
FIG. 19B shows the corresponding sulfur EDS map of the cathode of FIG. 19A.
Figure 19C:
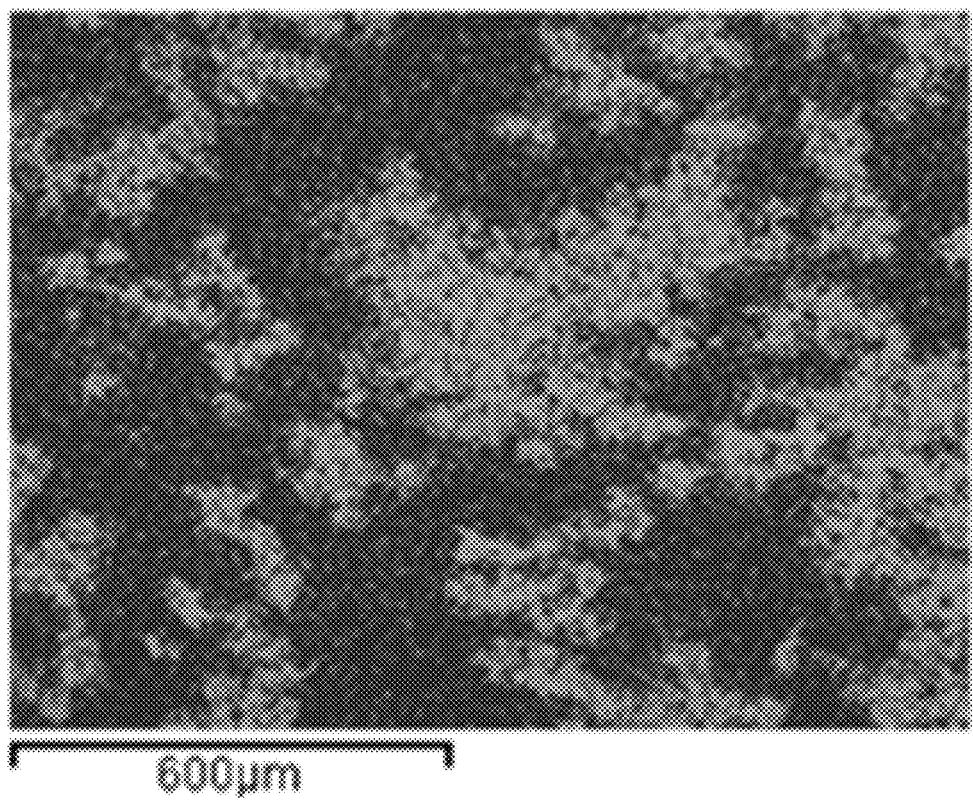
FIG. 19C shows the corresponding carbon EDS map of the cathode of FIG. 19A.

Coin cell batteries with the S-CNF cathode were assembled in reverse order (sulfur-infusion side facing the separator) to verify the impact of the side-of-sulfur-infusion and a slight decrease in performance was found (see FIG. 15) which could be attributed to slightly denser sulfur on the side-of-infusion that is not detectable by low-resolution EDS mapping. This could be expected due to the nature of the large sulfur particles and the short melting time such that larger sulfur particles could not fully melt and diffuse into the CNF during the quick process.

In addition, the effect of asymmetric heating was also investigated to try to induce a pronounced sulfur gradient. The sulfur-infused side plate was heated to the standard 140° C. and the opposing plate to only 120° C. (anything below 120° C. for the opposite plate would not melt the sulfur within 5 seconds). It was found this merely decreased the overall performance most likely due to insufficient melt diffusion of sulfur particles during processing (see FIGS. 16A-16C and 17A-17C).

Figure 20:
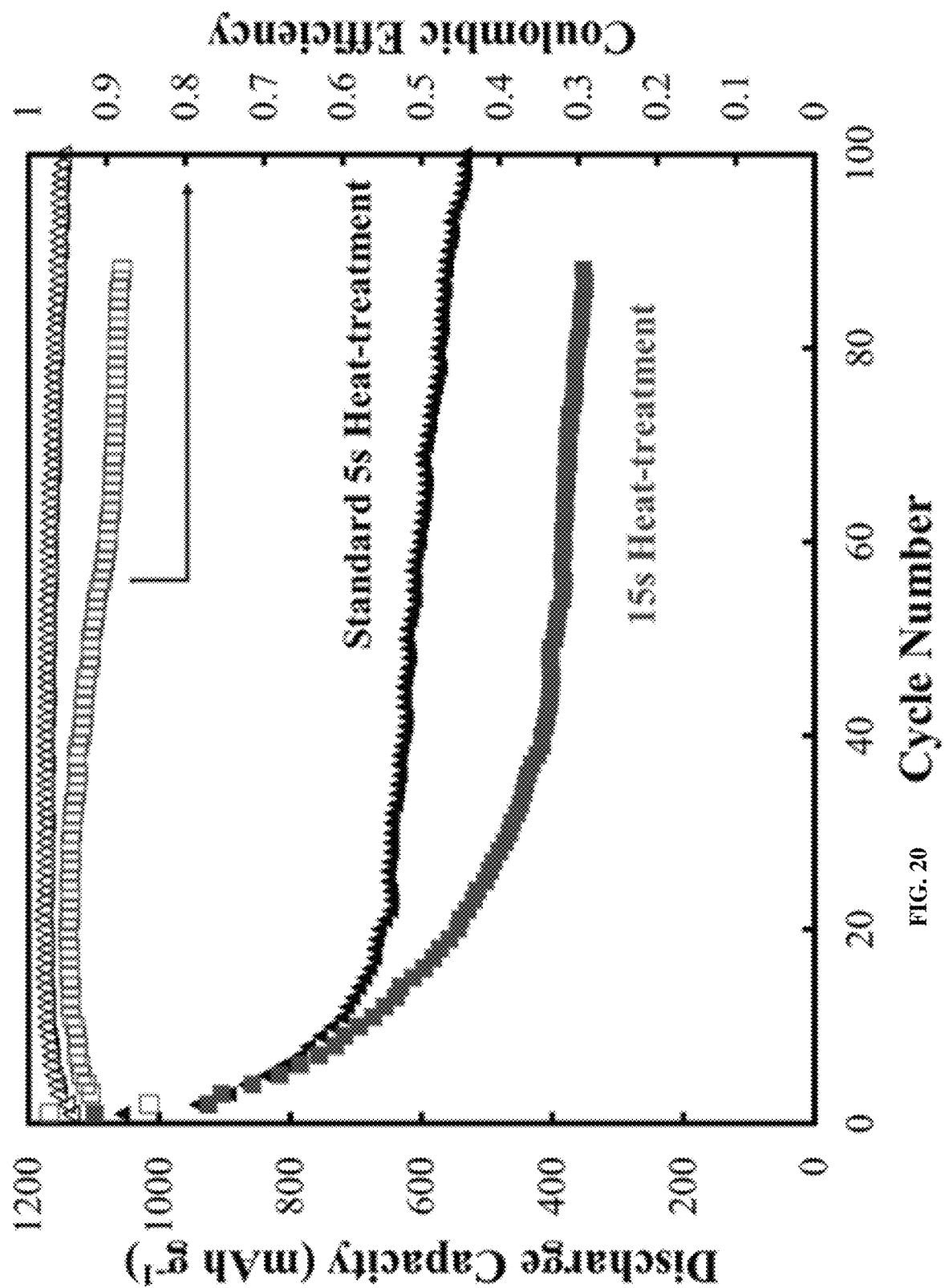
FIG. 20 shows cycling performance of the cathode of the invention after a standard 5 seconds of heat treatment and after 15 seconds of heat treatment.

Furthermore, the effect of increasing the heating time from 5 second to 15 and 30 seconds was investigated. SEM and EDS showed that increasing the heating time to 15 seconds induced formation of larger sulfur agglomerates. Upon further increasing the heating time to 30 seconds, the formed sulfur agglomerates also increased in size and number (see FIGS. 18A-18C and 19A-19 C). The cycling performance decreased considerably with 15 seconds of heat pressing, (see FIG. 20) thus validating that the rapid 5 second melt pressing was best for diffusing the commercial sulfur into the CNF mat without significant sulfur agglomeration.

Being completely free-standing, S-CNF cathodes eliminate the problem of significant excess weight being added to the cathodes by obviating the need for insulating binders and a separate current collector. Table 2 shows a direct comparison with literature. Most "free-standing" studies require vacuum infiltration (not suitable for scale-up) as well as long duration sulfur-deposition methods that can only be done in small batches within a furnace or oven (also not suitable for scale-up). A few methods utilize electrospun carbon nanofibers as the host material for sulfur composite cathodes but such known methods either include additional processing, additives or provide a relatively low C-rate performance.

The only method that used a truly short sulfur-infusion period required CNT-growth on a carbon cloth substrate (additional current collector) that contributed up to 37% of the discharge capacity. Moreover, the CNFs of the present invention are significantly less expensive than CNTs, even on a commercial scale. In addition, the performance of the CNT cathodes was only demonstrated over a very short number of cycles at low C-rates.

TABLE 2

Comparison of S-CNF to relevant Li—S cathodes in literature - cathode material, sulfur deposition technique, sulfur loading, discharge capacity, and retention

| Cathode Composite | Deposition[a] | Loading[b] | Discharge Capacity (C-rate) | % Retention (# of cycles) |
|---|---|---|---|---|
| S-MWCNT (slurry-based) [49] | MD 24 h | ~56% | 866 mAh $g^{-1}$ (0.5 C) | 70 (50) |
| MWCNT/S vacuum filtered [20] | MD 2.5 h | 54% | 995 mAh $g^{-1}$ (0.05 C) | 70 (150) |
| Graphene oxide/ZnO additive [29] | MD 10 h | ~1 mg $cm^{-2}$ | ~1000 mAh $g^{-1}$ (0.2 C) | 85 (100) |
|  |  |  | 796 mAh $g^{-1}$ (1 C) | 81 (250) |
| Mesoporous graphene oxide paper [24] | VD/MD 14 h | 55% | 1393 mAh $g^{-1}$ (0.1 C) | 49 (50) |
| Few-layer graphene sheets [50] | Solution | 52% | 800 mAh $g^{-1}$ (0.5 C) | 65 (50) |
|  |  |  | 403 mAh $g^{-1}$ (2 C) | 74 (400) |
| Graphene oxide/nano sulfur freeze-dried suspension [51] | MD 5 h | 63% | 957 mAh $g^{-1}$ (0.2 C) | 84 (200) |
|  |  |  | 657 mAh $g^{-1}$ (1 C) | 90 (168) |
| $TiO_2$-grafted carbonized filter paper (free-standing) [25] | MD 12 h | ~2 mg $cm^{-2}$ | 1606 mAh $g^{-1}$ (0.5 C) | 53 (200) |
|  |  |  | 1200 mAh $g^{-1}$ (1 C) | 45 (500) |
| Electrospun porous CNF (free-standing) + graphene [12]* | VD 12 h | 72% | 1214 mAh $g^{-1}$ (0.2 C) | 78 (200) |
| KOH-activated, electrospun CNF/Cu (free-standing) [52]* | MD 8 h | 52% | 900 mAh $g^{-1}$ (0.03 C) | 76 (100) |

TABLE 2-continued

Comparison of S-CNF to relevant Li—S cathodes in literature - cathode material,
sulfur deposition technique, sulfur loading, discharge capacity, and retention

| Cathode Composite | Deposition[a] | Loading[b] | Discharge Capacity (C-rate) | % Retention (# of cycles) |
|---|---|---|---|---|
| KOH-activated, electrospun CNT/CNF (free-standing) [26]* | MD 8 h | 40% | 1592 mAh g$^{-1}$ (0.03 C) | 40 (100) |
| Electrospun CNF (free-standing) [31]* | VD 15 m | ~55% | 1250 mAh g$^{-1}$ (0.06 C) | 76 (50) |
| CVD-grown CNTs on carbon substrate [32] | MD 2 m | <45%[c] | ~1175 mAh g$^{-1}$ (0.04 C) | 77 (10) |
| | | | ~800 mAh g$^{-1}$ (0.17 C) | 100 (20) |
| This invention: electrospun CNF (free-standing) | UR 5 s | ~55% | 755 mAh g$^{-1}$ (0.2 C) | 72 (100) |
| | | | 550 mAh g$^{-1}$ (0.5 C) | 100 (150) |

[a]Deposition techniques include melt diffusion (MD), vapor deposition (VD), and the deposition technique of the present invention (ultra-rapid, UR)
[b]Loading based on all components from reported values and/or the current collector weight
[c]The bare carbon cloth substrate (without CNTs) contributed 36% of capacity reported, which has a high specific weight of about 8.5 mg cm$^{-2}$ thus reducing the sulfur content in the final electrodes to <45%
*Free-standing electrodes fabricated by electrospinning

C. CONCLUSION

The present invention provides an ultra-rapid method for diffusing sulfur into nanostructures such as electrospun carbon nanofibers to be used cathodes for lithium-sulfur batteries. The sulfur deposition method drastically reduced the time to infuse the cathode with sulfur from about 10 hours to only 5 seconds, showing great promise towards practical fabrication of Li—S cathodes. In just 5 seconds, CNF were sulfurized with up to 60 wt. % sulfur and produced highly reversible electrochemistry. S-CNF cathodes demonstrated 100% capacity retention at over 150 cycles at 0.5 C (discharge capacity of about 550 mAh g$^{-1}$). The good performance of such simple cathodes suggests that chemical adsorption may play a role for reversibility and capacity retention as the role of micro-/meso-pores for complete sulfur confinement. The polysulfide-CNF interactions are of interest. Moreover, the electrospun CNF structures have two important elements that allow such simple cathodes:

(i) they are inherently free-standing thereby obviating the need for binders, additional current collectors, or costly slurry-based fabrication. The weight contribution of these inactive cell components in prior art electrodes is significant and estimated to contribute 30-50 wt. % of the entire cathode. See N. Li, Z. Chen, W. Ren, F. Li and H. M. Cheng, *Proceedings of the National Academy of Sciences of the United States of America*, 2012, 109, 17360-17365. On the industrial level, electrode processing (i.e. slurry mixing and casting) makes up 30% of the manufacturing costs in commercialized lithium-ion batteries. See ref 53.

(ii) CNFs provide excellent nano-architecture for cathodes via continuous conductive pathways for uninterrupted electron-transport and the inter-fiber macropores facilitate electrolyte diffusion to the sulfur for redox reactions to occur. In addition, the relatively simple nanoarchitecture may shed light on the importance of the role of mesopores (sulfur entrapment) with respect to sulfide chemisorption.

Sulfide adsorption mechanisms may also play a role in the fabrication process. The present method allows improvement of the cathode with smaller sulfur (nano-sulfur) to improve sulfur utilization and accessibility to provide ultra-high sulfur loading (>8 mg cm$^{-2}$, >80 wt. %), and tailoring the CNF materials to improve shuttling and utilization without compromising the simplicity of the method. The simple fabrication of these binder-free, free-standing cathodes presents a practical substitute for cathode preparation.

All documents mentioned herein are hereby incorporated by reference in their entirety or alternatively to provide the disclosure for which they were specifically relied upon. The applicant(s) do not intend to dedicate any disclosed embodiments to the public, and to the extent any disclosed modifications or alterations may not literally fall within the scope of the claims, they are considered to be part hereof under the doctrine of equivalents.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

REFERENCES

1. L. F. Nazar, M. Cuisinier and Q. Pang, *MRS Bulletin*, 2014, 39, 436-442.
2. S. E. Cheon, K. S. Ko, J. H. Cho, S. W. Kim, E. Y. Chin and H. T. Kim, *Journal of The Electrochemical Society*, 2003, 150, A796-A799.
3. 20020045102, 2002.
4. D. W. Wang, Q. Zeng, G. Zhou, L. Yin, F. Li, H. M. Cheng, I. R. Gentle and G. Q. M. Lu, *Journal of Materials Chemistry A*, 2013, 1, 9382-9394.
5. N. Jayaprakash, J. Shen, S. S. Moganty, A. Corona and L. A. Archer, *Angewandte Chemie*, 2011, 123, 6026-6030.
6. S. Evers and L. F. Nazar, *Accounts of Chemical Research*, 2013, 46, 1135-1143.
7. M. S. Song, S. C. Han, H. S. Kim, J. H. Kim, K. T. Kim, Y. M. Kang, H. J. Ahn, S. X. Dou and J. Y. Lee, *Journal of The Electrochemical Society*, 2004, 151, A791-A795.
8. X. Liang, C. Hart, Q. Pang, A. Garsuch, T. Weiss and L. F. Nazar, *Nat Commun*, 2015, 6.
9. K. Mi, Y. Jiang, J. Feng, Y. Qian and S. Xiong, *Advanced Functional Materials*, 2016, 26, 1571-1579.
10. H. J. Peng, J. Q. Huang, M. Q. Zhao, Q. Zhang, X. B. Cheng, X. Y. Liu, W. Z. Qian and F. Wei, *Advanced Functional Materials*, 2014, 24, 2772-2781.
11. X. a. Chen, Z. Xiao, X. Ning, Z. Liu, Z. Yang, C. Zou, S. Wang, X. Chen, Y. Chen and S. Huang, *Advanced Energy Materials*, 2014, 4, 1301988.
12. Z. Li, J. T. Zhang, Y. M. Chen, J. Li and X. W. Lou, *Nat Commun*, 2015, 6.

13. J. G. Wang, K. Xie and B. Wei, *Nano Energy*, 2015, 15, 413-444.
14. Y. Zhao, Y. Zhang, Z. Bakenova and Z. Bakenov, *Frontiers in Energy Research*, 2015, 3.
15. G. Zhou, S. Pei, L. Li, D. W. Wang, S. Wang, K. Huang, L. C. Yin, F. Li and H. M. Cheng, *Advanced Materials*, 2014, 26, 625-631.
16. N. Li, Z. Chen, W. Ren, F. Li and H. M. Cheng, *Proceedings of the National Academy of Sciences of the United States of America*, 2012, 109, 17360-17365.
17. Y. Zhao, F. Yin, Y. Zhang, C. Zhang, A. Mentbayeva, N. Umirov, H. Xie and Z. Bakenov, *Nanoscale Research Letters*, 2015, 10, 450.
18. A. Schneider, C. Suchomski, H. Sommer, J. Janek and T. Brezesinski, *Journal of Materials Chemistry A*, 2015, 3, 20482-20486.
19. Y. Chen, S. Lu, X. Wu and J. Liu, *The Journal of Physical Chemistry C*, 2015, 119, 10288-10294.
20. Z. Yuan, H. J. Peng, J. Q. Huang, X. Y. Liu, D. W. Wang, X. B. Cheng and Q. Zhang, *Advanced Functional Materials*, 2014, 24, 6105-6112.
21. C. Wu, L. Fu, J. Maier and Y. Yu, *Journal of Materials Chemistry A*, 2015, 3, 9438-9445.
22. L. Zhu, H. J. Peng, J. Liang, J. Q. Huang, C. M. Chen, X. Guo, W. Zhu, P. Li and Q. Zhang, *Nano Energy*, 2015, 11, 746-755.
23. W. Ni, J. Cheng, X. Li, Q. Guan, G. Qu, Z. Wang and B. Wang, *RSC Advances*, 2016, 6, 9320-9327.
24. X. Huang, B. Sun, K. Li, S. Chen and G. Wang, *Journal of Materials Chemistry A*, 2013, 1, 13484-13489.
25. Z. Zhang, Q. Li, K. Zhang, W. Chen, Y. Lai and J. Li, *Journal of Power Sources*, 2015, 290, 159-167.
26. L. Zeng, F. Pan, W. Li, Y. Jiang, X. Zhong and Y. Yu, *Nanoscale*, 2014, 6, 9579-9587.
27. G. L. Xu, Y. F. Xu, J. C. Fang, X. X. Peng, F. Fu, L. Huang, J. T. Li and S. G. Sun, *ACS Applied Materials & Interfaces*, 2013, 5, 10782-10793.
28. G. He, X. Ji and L. Nazar, *Energy & Environmental Science*, 2011, 4, 2878-2883.
29. M. Yu, A. Wang, F. Tian, H. Song, Y. Wang, C. Li, J. D. Hong and G. Shi, *Nanoscale*, 2015, 7, 5292-5298.
30. G. Li, H. Jing, H. Li, L. Liu, Y. Wang, C. Yuan, H. Jiang and L. Chen, *Ionics*, 2015, 21, 2161-2170.
31. K. Fu, Y. Li, M. Dirican, C. Chen, Y. Lu, J. Zhu, Y. Li, L. Cao, P. D. Bradford and X. Zhang, *Chemical Communications*, 2014, 50, 10277-10280.
32. M. Hagen, S. Dörfler, P. Fanz, T. Berger, R. Speck, J. Tübke, H. Althues, M. J. Hoffmann, C. Scherr and S. Kaskel, *Journal of Power Sources*, 2013, 224, 260-268.
33. M. S. A. Rahaman, A. F. Ismail and A. Mustafa, *Polymer Degradation and Stability*, 2007, 92, 1421-1432.
34. B. Zhang, F. Kang, J.-M. Tarascon and J.-K. Kim, *Progress in Materials Science*, 2016, 76, 319-380.
35. L. Laffont, M. Monthioux, V. Serin, R. B. Mathur, C. Guimon and M. F. Guimon, *Carbon*, 2004, 42, 2485-2494.
36. L. Zhang, A. Aboagye, A. Kelkar, C. Lai and H. Fong, *Journal of Materials Science*, 2014, 49, 463-480.
37. Z. Li, X. Li, Y. Liao, X. Li and W. Li, *Journal of Power Sources*, 2016, 334, 23-30.
38. G. Li, J. Sun, W. Hou, S. Jiang, Y. Huang and J. Geng, *Nature Communications*, 2016, 7, 10601.
39. N. W. Li, Y. X. Yin and Y. G. Guo, *RSC Advances*, 2016, 6, 617-622.
40. Z. Wei Seh, W. Li, J. J. Cha, G. Zheng, Y. Yang, M. T. McDowell, P. C. Hsu and Y. Cui, *Nature Communications*, 2013, 4, 1331.
41. C. Zhang, H. B. Wu, C. Yuan, Z. Guo and X. W. Lou, *Angewandte Chemie*, 2012, 124, 9730-9733.
42. H. J. Peng, T. Z. Hou, Q. Zhang, J. Q. Huang, X.-B. Cheng, M. Q. Guo, Z. Yuan, L. Y. He and F. Wei, *Advanced Materials Interfaces*, 2014, 1.
43. Q. Pang, X. Liang, C. Y. Kwok and L. F. Nazar, *Journal of The Electrochemical Society*, 2015, 162, A2567-A2576.
44. L. Ma, H. L. Zhuang, S. Wei, K. E. Hendrickson, M. S. Kim, G. Cohn, R. G. Hennig and L. A. Archer, *ACS Nano*, 2016, 10, 1050-1059.
45. J. Song, T. Xu, M. L. Gordin, P. Zhu, D. Lv, Y.-B. Jiang, Y. Chen, Y. Duan and D. Wang, *Advanced Functional Materials*, 2014, 24, 1243-1250.
46. K. A. See, Y. S. Jun, J. A. Gerbec, J. K. Sprafke, F. Wudl, G. D. Stucky and R. Seshadri, *ACS Applied Materials & Interfaces*, 2014, 6, 10908-10916.
47. G. Zhou, L. C. Yin, D. W. Wang, L. Li, S. Pei, I. R. Gentle, F. Li and H. M. Cheng, *ACS Nano*, 2013, 7, 5367-5375.
48. D. W. Wang, F. Li, L. C. Yin, X. Lu, Z. G. Chen, I. R. Gentle, G. Q. Lu and H. M. Cheng, *Chemistry—A European Journal*, 2012, 18, 5345-5351.
49. M. Kazazi, F. Ghadami, M. R. Dadfar, M. Sobhani and A. H. Mohammadi, *Solid State Ionics*, 2016, 290, 40-46.
50. K. Xi, P. R. Kidambi, R. Chen, C. Gao, X. Peng, C. Ducati, S. Hofmann and R. V. Kumar, *Nanoscale*, 2014, 6, 5746-5753.
51. C. Wang, X. Wang, Y. Wang, J. Chen, H. Zhou and Y. Huang, *Nano Energy*, 2015, 11, 678-686.
52. L. Zeng, Y. Jiang, J. Xu, M. Wang, W. Li and Y. Yu, *Nanoscale*, 2015, 7, 10940-10949.

What is claimed is:
1. A free-standing electrically conductive porous structure, consisting essentially of:
   an electrically conductive porous substrate with a layer of sulfur on a surface of the electrically conductive porous substrate, wherein the sulfur layer includes an additive to reduce the viscosity of melted sulfur for diffusing the melted sulfur into the substrate;
   wherein at least a portion of the layer of sulfur is in pores of the substrate and located on a surface of the pores of the substrate,
   the free-standing electrically conductive porous structure contains at least 50 wt.% of sulfur and less than 10 wt.% of graphene, both based on a total weight of the electrically conductive porous structure,
   the additive to reduce the viscosity of melted sulfur for diffusing the sulfur into the substrate comprises an element selected from the group consisting of selenium, tellurium, bromine and iodine,
   the sulfur layer contains less than 30 wt.% of a combination of the additive to reduce the viscosity of melted sulfur for diffusing the sulfur into the substrate and one or more optional additives selected from a conductive additive and an additive that prevent or reduces active material dissolution or loss into an electrolyte during device operation, and
   when the porous structure is configured as a cathode for a battery, the battery including the cathode has a C rate of at least 0.2 C at a discharge capacity of from about 400 mAh $g^{-1}$ to about 1675 mAh $g^{-1}$ with a cycling stability of at least 100 cycles.
2. The free-standing electrically conductive porous structure of claim 1 wherein the electrically conductive porous structure has a sulfur loading of at least about 1.0 mg $cm^{-2}$.

3. The free-standing electrically conductive porous structure of claim 1, wherein the C rate is at least 0.5 C and the cycling stability is at least 120 cycles.

4. The free-standing electrically conductive porous structure of claim 1, wherein the free-standing electrically conductive porous structure has a flexibility that passes a Mandrel Bend test of ASTM D522.

5. The free-standing electrically conductive porous structure of claim 1, wherein the discharge capacity is in a range of from about 700 mAh $g^{-1}$ to about 1625 mAh $g^{-1}$.

6. The free-standing electrically conductive porous structure of claim 1, wherein the sulfur layer comprises the conductive additive and the conductive additive is selected from the group consisting of conductive carbon powders, graphite powders, mesoporous carbons, activated carbons, carbon nanotubes, MXenes, conductive polymers, conductive metal oxides/suboxides, metals and any other material that conducts electrons.

7. The free-standing electrically conductive porous structure of claim 1, wherein the electrically conductive porous substrate comprises a material selected from carbon nanofibers, carbon nanotubes, carbon rods, and combinations thereof.

8. The free-standing electrically conductive porous structure of claim 1, wherein the electrically conductive porous substrate has a porosity in a range of from about 10% to about 90% and a conductivity in a range of from about $10^{-3}$ S/cm to about $10^5$ S/cm.

9. The free-standing electrically conductive porous structure of claim 1, wherein the sulfur layer comprises the additive that prevents or reduces active material dissolution or loss into an electrolyte during device operation and the additive that prevents or reduces active material dissolution or loss into an electrolyte during device operation comprises an additive that interacts with sulfur or polysulfides by polar interaction or Lewis-acid base interaction, said additive being selected from the group consisting of compounds containing polar elements, polymers and compounds containing metals such as titanium or vanadium.

10. The free-standing electrically conductive porous structure of claim 1, wherein the electrically conductive porous structure has a sulfur content in a range of from about 50 wt.% to about 90 wt.%, based on a total weight of the structure.

11. The free-standing electrically conductive porous structure of claim 1, wherein the sulfur in the electrically conductive porous structure has an average particle size in a range of from 10 nm to 1000 nm.

12. A cathode of a battery comprising the electrically conductive porous structure of claim 1.

13. The cathode of claim 12, wherein the cathode has a sulfur loading in a range of from about 0.1 mg $cm^{-2}$ to about 15 mg $cm^{-2}$.

14. The cathode of claim 12, wherein the cathode does not include a separate current collector.

15. The free-standing electrically conductive porous structure of claim 1, wherein the electrically conductive porous structure has a sulfur content in a range of from about 50 wt.% to about 80 wt.%, based on a total weight of the structure.

16. The free-standing electrically conductive porous structure of claim 1, wherein the sulfur layer is applied by a method comprising steps of:
   applying sulfur in powder or particle form to the electrically conductive substrate; and
   heating the powder form of the sulfur to a temperature of from about 119° C. to about 170° C. with the electrically conductive porous substrate under a pressure of from about 100 psi to about 2000 psi.

17. The free-standing electrically conductive porous structure of claim 16, wherein the heating step is carried out for a period of from 5 seconds to about 100 seconds.

18. The free-standing electrically conductive porous structure of claim 17, wherein the electrically conductive porous substrate is a carbon nanofiber mat and the heating step is carried out by roll-pressing or by using press plates.

19. The free-standing electrically conductive porous structure of claim 17, wherein the sulfur in powder form or particle form has a particle size not greater than 100 mesh.

20. The free-standing electrically conductive porous structure of claim 17, wherein the porous substrate has a porosity of at least about 50%.

21. The free-standing electrically conductive porous structure of claim 1, wherein the sulfur layer comprises up to 10 wt.% of the one or more additives selected from a conductive additive, the additive to reduce the viscosity of melted sulfur for diffusing the sulfur into the substrate and the additive that prevents or reduces active material dissolution or loss into an electrolyte during device operation.

22. The free-standing electrically conductive porous structure of claim 1, wherein the sulfur layer comprises the conductive additive.

* * * * *